United States Patent [19]

Iwamura

[11] Patent Number: 6,144,946
[45] Date of Patent: Nov. 7, 2000

[54] ACCOUNTING DEVICE, COMMUNICATING APPARATUS, AND COMMUNICATION SYSTEM

[75] Inventor: Keiichi Iwamura, Yokohama, Japan

[73] Assignee: Canon Kabushiki Kaisha, Tokyo, Japan

[21] Appl. No.: 08/805,970

[22] Filed: Feb. 25, 1997

[30] Foreign Application Priority Data

Feb. 27, 1996 [JP] Japan .................................. 8-039830

[51] Int. Cl.[7] .................................................. G06F 17/60
[52] U.S. Cl. ................................ 705/30; 705/34; 705/50; 705/53
[58] Field of Search .................................. 705/30, 32, 1, 705/34, 400, 50, 51, 52, 53, 54, 59; 380/4, 25; 395/200.54; 348/12, 1, 3

[56] References Cited

U.S. PATENT DOCUMENTS

| | | | |
|---|---|---|---|
| 4,710,955 | 12/1987 | Kauffman | 380/10 |
| 4,806,977 | 2/1989 | Mizutani et al. | 355/8 |
| 4,977,594 | 12/1990 | Shear | 705/53 |
| 5,010,571 | 4/1991 | Katznelson | 705/53 |
| 5,047,928 | 9/1991 | Wiedemer | 705/52 |
| 5,103,392 | 4/1992 | Mori | 395/725 |
| 5,247,575 | 9/1993 | Sprague et al. | 380/9 |
| 5,339,239 | 8/1994 | Manabe et al. | 705/1 |
| 5,438,356 | 8/1995 | Ushiki et al. | 348/12 |
| 5,703,951 | 12/1997 | Dolphin | 380/25 |
| 5,724,521 | 3/1998 | Dedrick | 705/26 |
| 5,752,238 | 5/1998 | Dedrick | 705/14 |
| 5,768,521 | 6/1998 | Dedrick | 395/200.54 |
| 5,852,912 | 12/1998 | Reeder | 705/34 |

FOREIGN PATENT DOCUMENTS

| | | | |
|---|---|---|---|
| 0 428 252 A2 | 5/1991 | European Pat. Off. | H04N 7/167 |
| 0 487 041 A2 | 5/1992 | European Pat. Off. | |
| 0 618 539 A1 | 9/1993 | European Pat. Off. | G06F 15/21 |
| 0 621 515 A2 | 10/1994 | European Pat. Off. | |
| 0 679 958 A2 | 11/1995 | European Pat. Off. | |
| 0 696 121 A1 | 2/1996 | European Pat. Off. | H04L 29/06 |
| 60-077218 | 5/1985 | Japan . | |
| 60-191322 | 9/1985 | Japan . | |
| 64-068835 | 3/1989 | Japan . | |
| 2-044447 | 2/1990 | Japan . | |
| 4-064129 | 2/1992 | Japan . | |
| WO 88 02960 | 4/1988 | WIPO | H04L 9/00 |

OTHER PUBLICATIONS

Egan et al, "Cashing In On The Internet", U.S. News & World Report, Business & Technology, pp. 81–82, Nov. 13, 1995.

Mills–Scofield, Deborah, "The Internet, From Access to Zine", AT&T Technology, vol. 10, No. 3, pp. 2–10, Autumn 1995.

Oakes, Chris, "Online to Order—Which Dial–Up Service Is Right For You?", Netguide, Dec. 1, 1995.

Metcalfe, Bob, "On–Line Services In For Small Change On The Next Generation Internet", Infoworld, Dec. 25, 1996.

Patent Abstracts of Japan, vol. 010, No. 388 (M–549), Dec. 25, 1986 & JP 61 178334 A (Olympus Optical Co Ltd), Aug. 11, 1986.

*Primary Examiner*—Emanuel Todd Voeltz
*Assistant Examiner*—John W. Hayes
*Attorney, Agent, or Firm*—Fitzpatrick, Cella, Harper & Scinto

[57] ABSTRACT

An accounting device of the invention cooperates with a terminal station to allow one to use information from an information provider, and includes a first input unit for inputting first data PIDi and PIDj regarding the contents of providing information, a second input unit for inputting second data TIDi and TIDj regarding the use of hardware to carry out the use of the providing information at the terminal station, a third input unit for inputting third data PPC indicative of money information, and a checking unit for discriminating between a permission and an inhibition (prohibition) of the use of the information at the terminal station by using at least one of the first and second, and third data. The checking unit outputs a discrimination result about the permission or inhibition of the use to the external of the accounting device, thereby properly prohibit illegal use of the terminal station and contributing to a spread of network terminal apparatus.

27 Claims, 15 Drawing Sheets

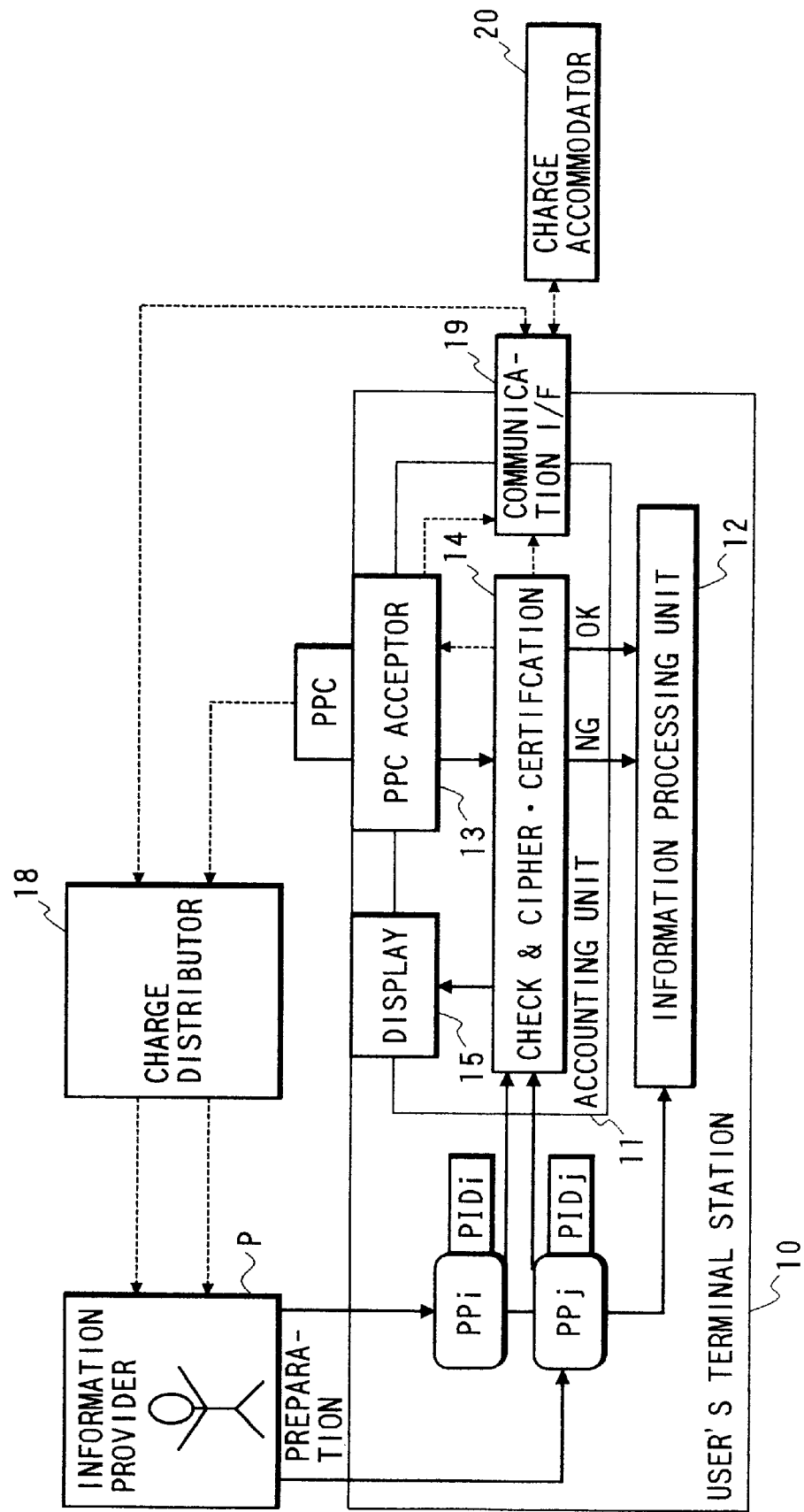

ACCOUNTING DEVICE, COMMUNICATING APPARATUS, AND COMMUNICATION SYSTEM

BACKGROUND OF THE INVENTION

1. Field of the Invention

The invention relates to accounting device, communicating apparatus, and communication system which are suitable for use in a multimedia network or the like in which information such as motion image data, still image data, audio data, computer data, computer program, and the like is transmitted.

2. Related Background Art

In recent years, in association with the disposition of an optical fiber network in an arterial communication network, spread of a cable television system, practical use of a satellite communication, spread of a local area network, and the like, there is increasing what is called an information service industry such that an information provider provides various information to the user by using such a communication network and collects a charge in accordance with the contents and an amount of the information. In such a service, it is important to properly account to the user for the provided information to the user.

However, actually, technology for protection of information is not always in place and illegal use of a program or video image (including audio) information becomes a problem. Hitherto, in order to prevent illegal use, there has been used a method such that a copy preventing function is added, a hardware machine number added to a computer or the like is used and a software machine number corresponding to the hardware machine number is allocated to the software itself, those two machine numbers are collated at the time of executing the program, or the like. However, the copy preventing function is inconvenient at the time of a backup or the like, and the machine number collation is inconvenient with respect to a machine number management or a sale, so that there approaches are not practicable.

As for the above problems, a concept called a "super distribution" which intends to protect a right of a software-rightful person (i.e., a person who has the right to use/copy the software; hereinbelow referred to as an information provider) has peen proposed by Ryoichi Mori and has been disclosed in Japanese Patent Application Laid-Open Nos. 60-77218, 60-191322, 6468835, 2-44447, 4-64129, and the like. FIG. 19 shows a conceptual diagram of the "super distribution" disclosed in Japanese Patent Application Laid-Open No. 4-64129. In an information provider P, a permission or an inhibition of a use of a software PPi (or PPJ) as providing information formed by himself is discriminated in a CHECK unit on the basis of its software peculiar data PIDi (or PIDJ) and a condition of each USERID of a user's terminal station. When the software can be used, a use career of the providing information is recorded into an SH unit and the information provider P demands a use charge of the providing information or the like on the basis of the career. SSU denotes a software service unit including the above means.

However, there are the following problems in the "super distribution".

(1) In the "super distribution", whether the user is a person permitted by the information provider or not is judged by user-peculiar data such as USERID. Therefore, in order to realize the "super distribution", at least storing means for the user peculiar data is needed. In such a system, it is necessary for the user to previously make an application to the information provider for use of information, get his own USERID or the like, and register the USERID as user peculiar data. A procedure to make an application for use or a management of many various user peculiar data such as USERIDs is troublesome.

(2) To prevent the illegal use of information or to allow the information provider to grasp a use situation of his own providing information, the "super distribution" has to use software career storing means in order to realize the "super distribution" and the information provider needs to carry out a request of a charge to the user or the like on the basis of the history. In the "super distribution", since information is not sold but is treated in a rental manner, the use history is needed. According to such a system, a user's privacy such that which information the user used cannot be protected.

(3) Although the "super distribution" is means and system for accurately grasping the use situation of the providing information, namely, for correctly grasping the use charge, means or system regarding a payment of the charge is not included. In the "super distribution", therefore, after the information provider knew the use situation of the providing information, it is necessary to demand and collect the charge by another means.

(4) In the "super distribution", the information provider can execute the accounting operation regarding the use of his own providing information by the software peculiar data. When the providing information is information such as a computer program which the "super distribution" initially aimed to develop in which although a capacity is small, the use of it is valuable, it is sufficient. However, in case of information of a large capacity such as a real-time motion image or the like which is regarded as a main target to be treated in the recent multimedia, in a manner similar to the charge for use, a charge for transmission also occupies a large weight. However, the "super distribution" doesn't correspond to the accounting regarding a charge for use of a line in the network or a charge for use of a CPU or a terminal station of the multimedia. Therefore, a system can also carry out the accounting for providers such as transmission path provider and terminal station provider regarding the multimedia network other than the information provider is needed.

(5) In the "super distribution", a system which enables a terminal station to be properly used in consideration of various factors exerting influences on loads of the line and terminal station is not constructed yet.

SUMMARY OF THE INVENTION

The invention is made in consideration of the foregoing problems (1) to (5) and it is an object of the invention to solve one or more of the above-mentioned problems.

Under the above object, according to an embodiment of the invention, there is provided an accounting device which cooperates with a terminal station which is used for the user to use information from an information provider, comprising:

first input means for inputting first data regarding contents of providing information;

second input means for inputting second data regarding a use of hardware to carry out the use of the providing information in the terminal station;

third input means for inputting third data indicative of money information; and discriminating means for discriminating a permission or an inhibition of the use of the information at the terminal station by using at least one of the first data and second data, and third data, wherein the discriminating means outputs a discrimination result about the permission or the inhibition of the use to the external of the device.

According to another embodiment of the invention, there is also provided a communicating apparatus which is used for the user to use information from an information provider, comprising:

first input means for inputting first data regarding contents of providing information;

second input means for inputting second data regarding a use of hardware to carry out a use of the providing information at a terminal station;

third input means for inputting third data indicative of money information; and discriminating means for discriminating a permission or an inhibition of the use of the information in the apparatus by using at least one of the first data and second data, and third data.

According to still another embodiment of the invention, there is also provided a communication system comprising:

a communicating apparatus for an information provider for providing information; and a communicating apparatus for a user which is used for the user to use the information, wherein the communicating apparatus for the information provider and the communicating apparatus for the user are connected to a common network, and the communicating apparatus for the user includes:

first input means for inputting first data regarding contents of providing information;

second input means for inputting second data regarding a use of hardware to carry out the use of the providing information at a terminal station;

third input means for inputting third data indicative of money information; and discriminating means for discriminating a permission or an inhibition of the use of the information in the apparatus by using at least one of the first data and second data, and third data.

The above and other objects and features of the present invention will become apparent from the following detailed description and the appended claims with reference to the accompanying drawings.

BRIEF DESCRIPTION OF THE DRAWINGS

FIG. 5 is a block diagram showing the fourth embodiment of the invention;

DETAILED DESCRIPTION OF THE PREFERRED EMBODIMENTS

Embodiments of the invention will now be explained hereinbelow with respect to only some examples with reference to the drawings.

The first embodiment according to the invention will now be described hereinbelow with reference to FIG. 1.

Figure 1:
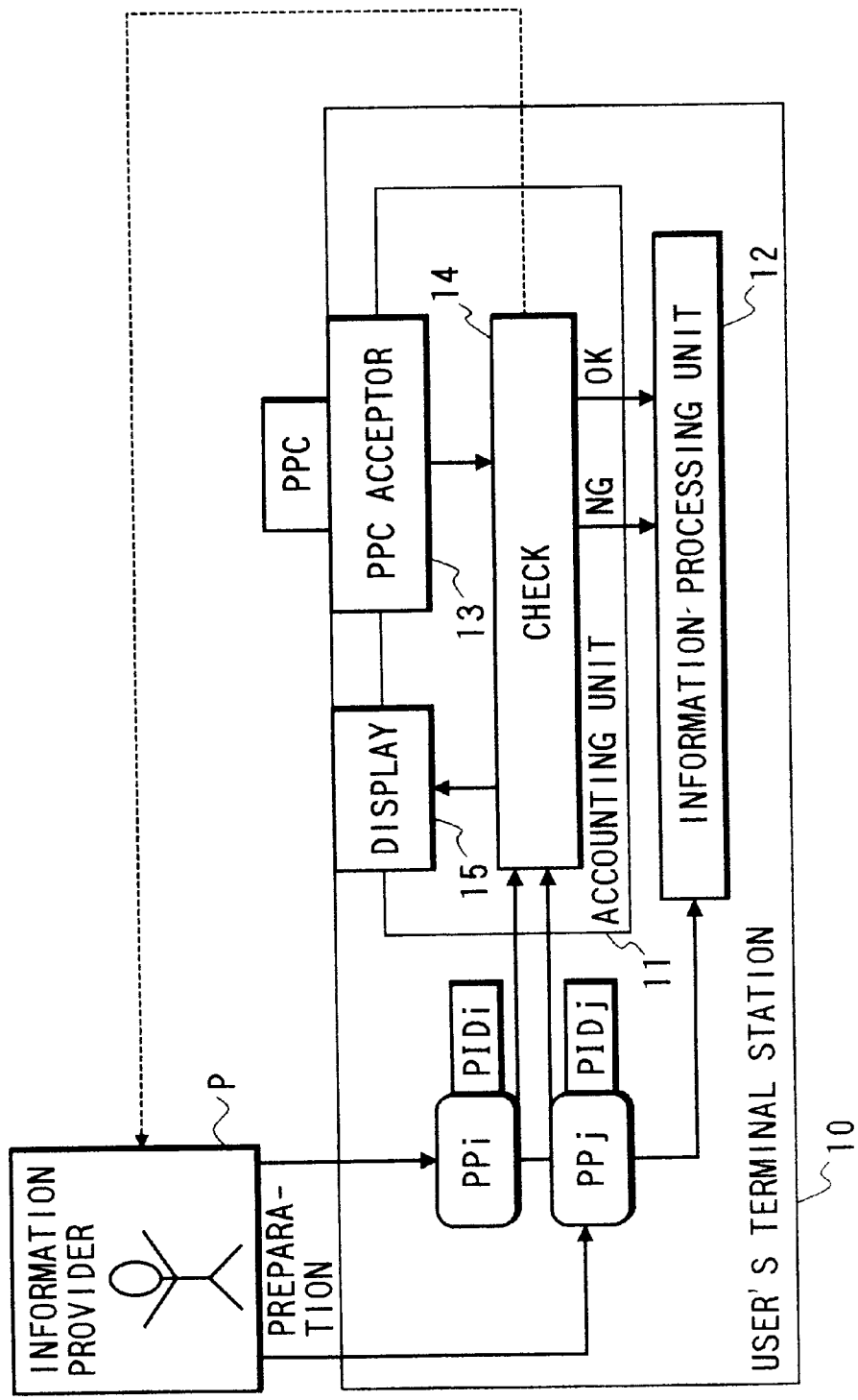
FIG. 1 is a block diagram showing the first embodiment of the invention.

In FIG. 1, P denotes the information provider and reference numeral 10 indicates a user's terminal station which is used by the user who receives information provided by the information provider P through a network. PP (PPi, PPj) denotes the providing information as onerous information which is provided to the user by the information provider P and PID (PIDi, PIDj) denotes the information peculiar data which is peculiar to the providing information PP and indicates, for example, a charge or the like. PPC denotes money information to be inputted to the user's terminal station 10. As will be described hereinafter, cash or a card is used as money information.

In the user's terminal station 10, reference numeral 11 denotes an accounting unit for executing an accounting to the user; and 12 an information processing unit for processing the providing information PP on the basis of signals OK and NG from the accounting unit 11 and sending a video image signal, an audio signal, or the like to the user.

In the accounting unit 11, reference numeral 13 denotes an acceptor for accepting the money information PPC; 14 a checking unit for discriminating a permission or an inhibition of the use of the providing information PP on the basis of the information peculiar data PID and the received money information PPC; and 15 a display unit for displaying necessary information.

The operation will now be described.

The information provider P provides the providing information PP as onerous information including the information peculiar data PID. The user's terminal station 10 is constructed in a manner such that when the providing information PP is used, the information PP is certainly transmitted via the accounting unit 11. The accounting unit 11 has the acceptor 13 of the money information PPC. When a use request for the providing information PP is generated, the checking unit 14 regarding the permission or inhibition of the use discriminates a use possibility of the providing information PP on the basis of at least a part of the information of the PID and PPC. For instance, there is a discrimination about whether the use charge shown in PID lies within the money information PPC or not. Whether the use is OK or not (NG) is notified to the information processing unit 12. If OK, the information processing unit 12 performs a process so as to enable the providing information PP to be used. Information (the use charge of the providing information PP, a balance of PPC, or the like) regarding the PID or PPC at this time is shown in the display unit 15. A judgment result about the permission or inhibition of the use by the checking unit 14 can be also displayed in the display unit 15.

As money information PPC in the embodiment, actual money, namely, cash can be used or a prepaid card such as a telephone card can be also used. Electronic information which has been stored in a floppy disk, IC card, PCMCIA, or the like and which is equivalent to the money can be also used.

In is embodiment, the permission or inhibition of the use of the providing information PP is discriminated by the money information PPC which doesn't exist on the user's side in place of the user peculiar data USERID of each user. Therefore, it is unnecessary for the user to make an application for acquisition of the user peculiar data. Since the user merely has the money information PPC equivalent to the actual money, namely, merely pays a fee for the information to be used, it is natural and convenient. Consequently, it is unnecessary to manage many user peculiar information and the problem of (1) is solved.

In the embodiment, since the user has no user peculiar data, the user's privacy such that which information he used is revealed to the information provider. Although it might seem that the rights of the information provider P are not protected, so long as a charge corresponding to a use frequency of his providing information is paid, it is sufficient for the information provider P. The provider P doesn't need to know the private information of the user, namely, which user used which information.

In the embodiment, although there is no use career storing means having contents indicating which information PP the user having which USERID used, use frequency storing means having contents indicating how many times which providing information has been used or use notifying means for notifying of a fact that the providing information is being used at present can be provided. In FIG. 1, use frequency information is notified to the information provider P along a path shown by a broken line. Specific use frequency storing means or use notifying means will be described in detail in the second to sixth embodiments which will be explained hereinlater. Therefore, the foregoing problem of (2) regarding the privacy protection of the user is also solved by the above method.

In the embodiment, since the PPC is the information equivalent to the money, the use of the PPC itself corresponds to a payment of the charge. Consequently, the above-mentioned problem of (3) is also solved. Specific acquiring and collecting method of the PPC and a specific distributing methods of the charge are shown in the second to sixth embodiments in conjunction with the problem of (2).

Further, the problem of (4) can be solved by a method whereby, in addition to the PID, data called a TID which is set by a transmission path provider, a terminal station provider, or the like concerning the use of a transmission path or a terminal station is annexed to the providing information. The TID can be also formally included in the PID. A specific example of a method of solving the problem of (4) regarding the TID will be described in detail in the ninth and subsequent embodiments.

Figure 2:
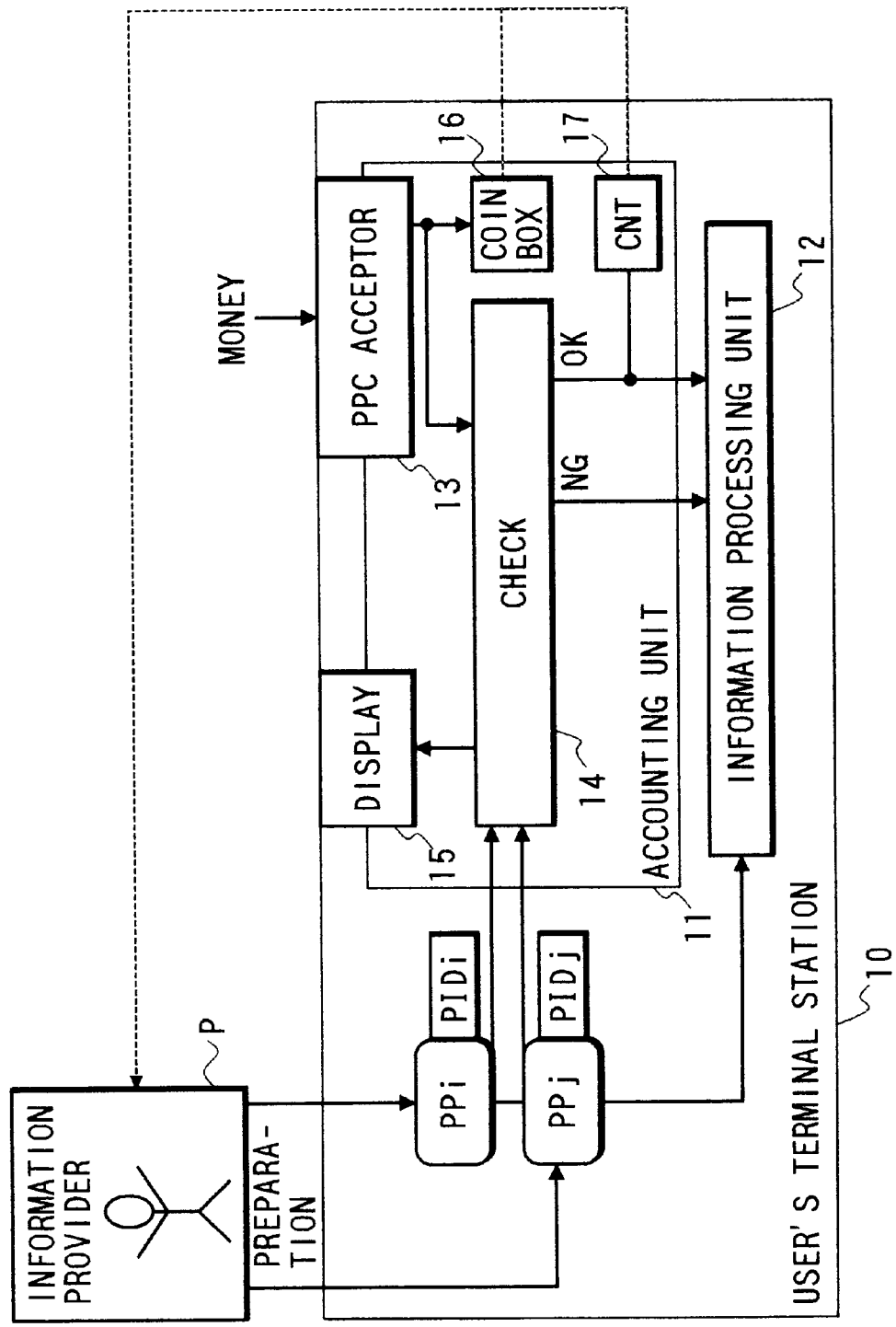
FIG. 2 is a block diagram showing the second embodiment of the invention.

A case where the PPC is an actual money is shown as a second embodiment in FIG. 2. In this instance, the acceptor 13 of the PPC is an inlet for coin or bill. The user first inputs predetermined money into the acceptor 13 of the PPC. When an amount of money exceeds a charge shown in the PID, the checking unit 14 permits the use of the providing information PP. The accounting unit 11 displays the use charge of the providing information PP in the display unit 15. The user inputs the money corresponding to the displayed charge into the PPC acceptor 13. The checking unit 14 checks the permission or inhibition of the use of the providing information PP on the basis of the input money.

When the charge is updated in accordance with an elapse of time, such a fact is displayed and an additional charge according to it can be also inputted. However, the inputted money amount is stored into a coin box 16 and is collected by the information provider P or some institution for collecting the charge. In this instance, a use frequency of each providing information PP is recorded and collected into a counter 17 and the charge in the coin box 16 is distributed to each information provider P in accordance with the use frequency. When the use frequency is unnecessary because there is one providing information PP or the like, the counter 17 can be omitted.

Figure 3:
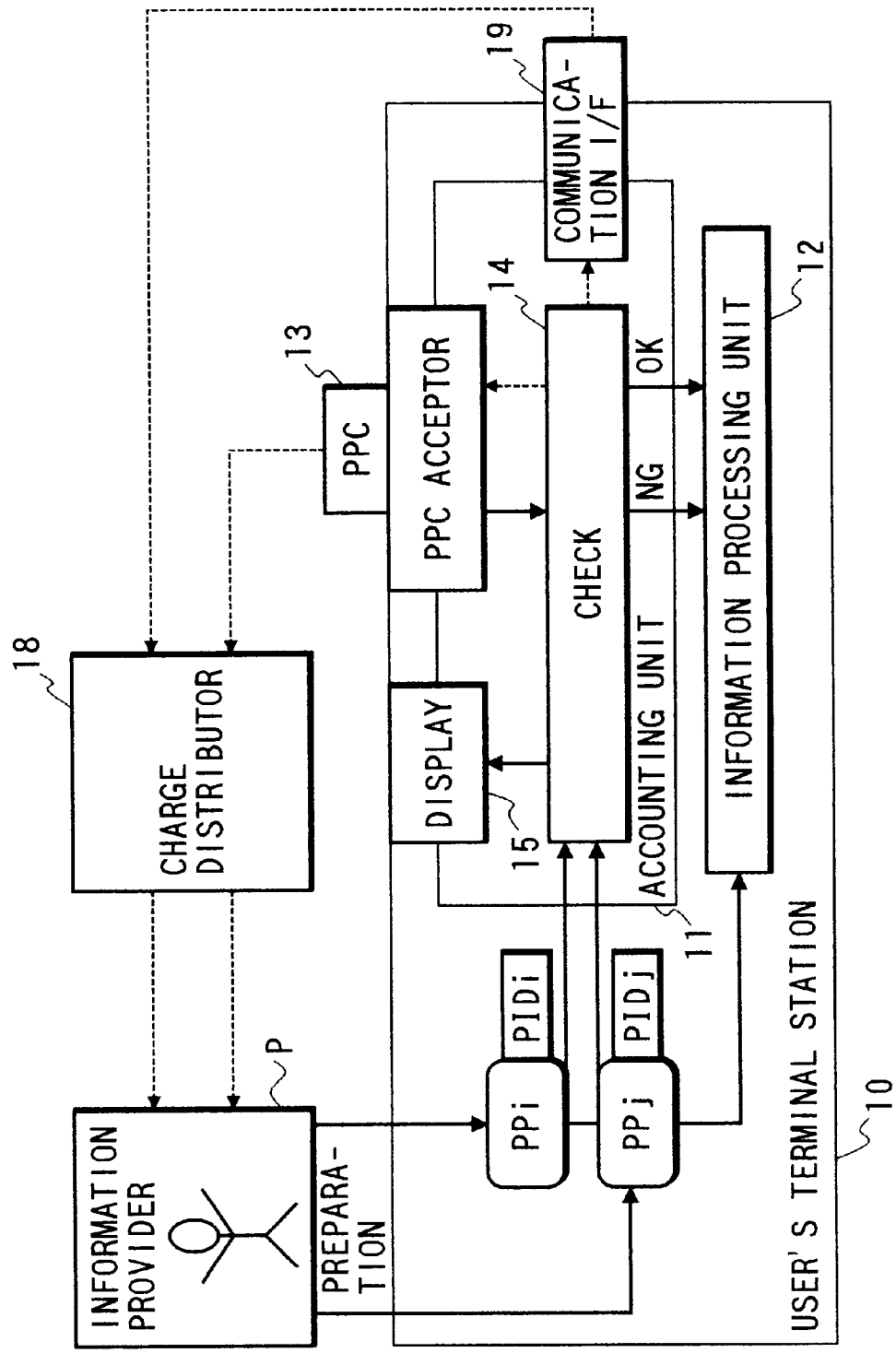
FIG. 3 is a block diagram showing the third embodiment of the invention.

A case where the PPC is a prepaid card such as a telephone card is shown as a third embodiment in FIG. 3. The user inserts the prepaid card into the acceptor 13 of the PPC and the checking unit 14 discriminates whether the money amount written in the prepaid card is larger than the use charge (the money amount can be also displayed) shown in the PID or not. When it is larger, the checking unit 14 permits the use of the PP. In this case, the checking unit 4 and the acceptor 13 of the PPC are constructed in a manner such that even if the use charge of the PP is updated with the elapse of time, so long as it lies within the charge written in the prepaid card, the device can be continuously used. When the acceptor of the PPC is constructed so that another prepaid card can be additionally inserted, the device can be also used for a further long time. When obtaining such a prepaid card, in a manner similar to the current telephone card, so long as a sales form such that the prepaid card are sold by many sales stores, they can be easily obtained anywhere. In this case, a manufacturing company of the prepaid card is a distributor 18 of the charge and the information provider P receives the distribution of the charge according to the use frequency of the providing information PP by registering into the charge distributor 18. The forgoing sales store is included in the charge distributor 18.

Figure 4:
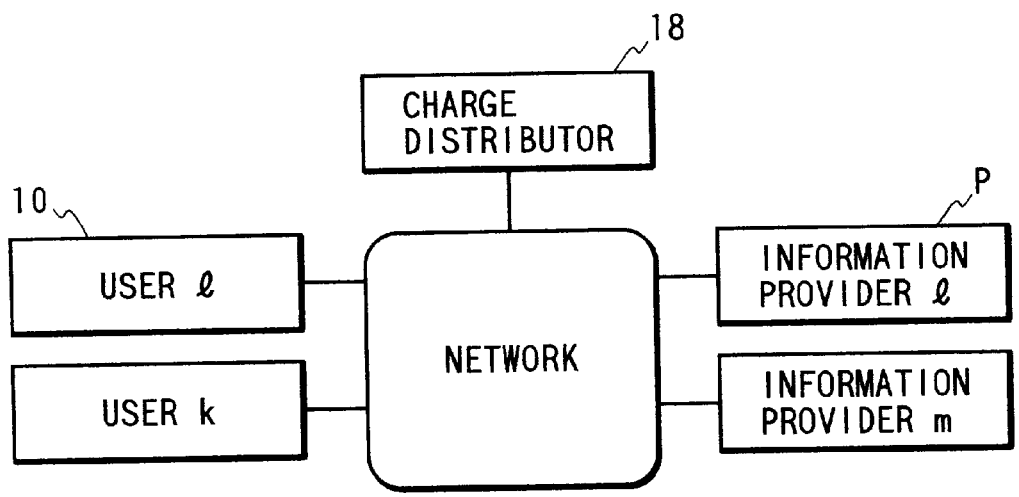
FIG. 4 is a block diagram showing a network in the third embodiment shown in FIG. 3.

The distribution of the charge according to the use frequency is realized by a method whereby the accounting unit 11 notifies the charge distributor 18 of the present use information by using a communication I/F 19. The device is constructed such that the use notification is generated only when the accounting unit 11 updates the money amount written in the prepaid card. When obtaining the providing information PP by a communication as well, the communication I/F 19 can be shared. In this case, the terminal apparatuses of the charge distributor 18, information provider, and user are connected to a network as shown in FIG. 4 and the charge distributor 18 distributes the charge to the information provider P on the basis of the notification.

When the device doesn't have the communication I/F 19, there is also a method of changing the kind of prepaid card in accordance with the information to be used. In this instance, the checking unit 14 executes a process for examining the kind of prepaid card in accordance with the information and also discriminates the permission or inhibition of the use for it. It is also possible to construct such that the accounting unit 11 has means for recording a use record of the providing information PP to the prepaid card and by collecting the prepaid card by the charge distributor 18, the charge according to the use frequency is distributed. In this instance, in order to promote the collection of the prepaid card, it is sufficient to construct a sales style such that in case of exchanging the prepaid card, it is enough to use the charge of only the money information and in the case where the prepaid card is not exchanged, in addition to the charge of the charge information of the money information, the charge of the prepaid card itself is also added or the like. However, the charge corresponding to the use record which cannot be collected can be also distributed at a ratio according to the use record that could be collected.

Figure 6:
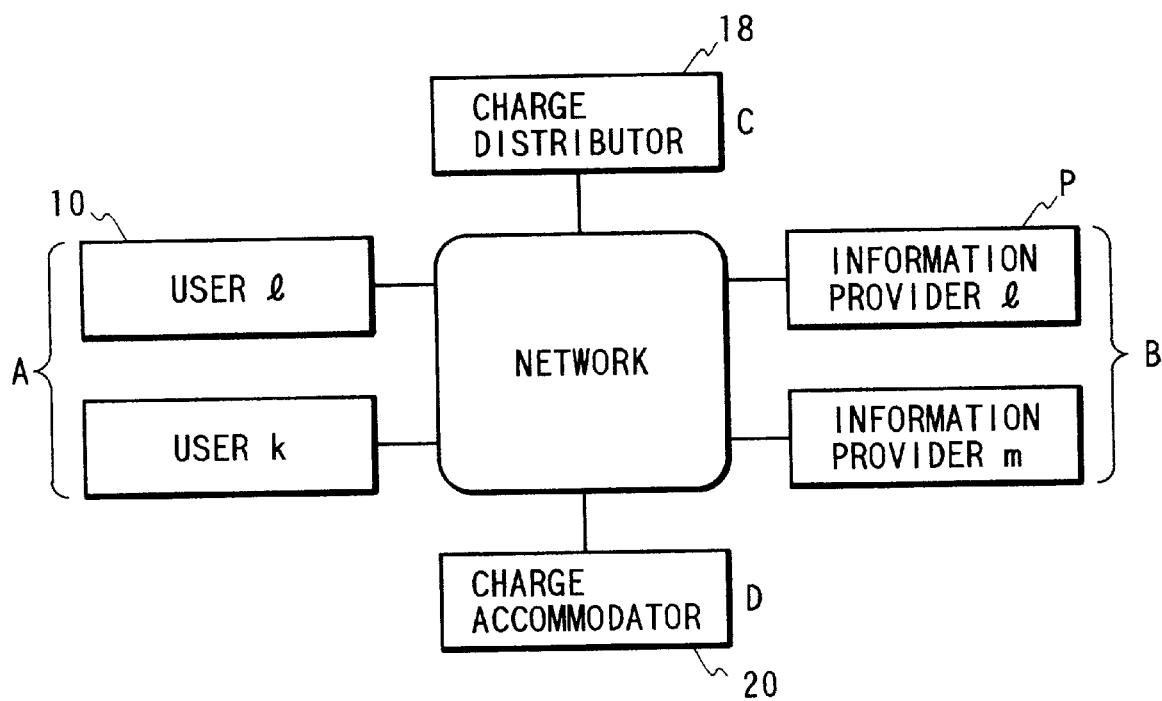
FIG. 6 is a block diagram showing a network in the fourth embodiment shown in FIG. 5.

FIGS. 5 and 6 show a case where the PPC is a floppy disk or an electric or/and magnetic device which is easily rewritable as a fourth embodiment. In this instance, money information that is stored in the PPC is data guaranteed by a bank or another financial institution or the like or special data which can be added by only the charge distributor 18 including a sales store. The user inserts the PPC into the acceptor 13 of the PPC. The accounting unit 11 reads out the money information from the PPC. When the money amount is larger than the charge shown in the PID (the money amount can be also displayed) and the accounting unit 11 can demand a use charge to the PPC, the checking unit 14 permits the use of the PP. In this case, even if the use charge of the PP is updated depending on the time, the device can be continuously used so long as the use charge lies within the charge written in the PPC.

Since the money information in this case is electronic information, input and output of the money information can be also executed by a communication by a predetermined procedure with the charge distributor 18 through the communication I/F 19. In this instance, different from the first and second embodiments, since the user doesn't directly pay the actual money to the charge distributor 18, the bank or another financial institution (hereinafter, referred to as a charge accommodator 20 in FIGS. 5 and 6) which is under contract with the user guarantees a money payment of the user. Further, even with respect to a notification of the use information, in a manner similar to the third embodiment, by informing the charge distributor 18 of the present use information by using the communication I/F 19, the charge can be distributed in accordance with the use frequency. In this case, the use charge can be also directly sent to the charge distributor 18 or information provider P by electronic money information.

Specifically speaking, input and output of electronic money information can be realized by the following communicating process. However, it is assumed that the accounting unit 11 has enciphering and authorizing processing means as will be explained hereinlater and means for safely managing a time stamp shown by a TA or the like, which will be explained hereinlater. This is because since the PPC is a medium such as a floppy disk or the like which is easily rewritable, there is a possibility such that an unfair practice is performed by a copy or the like of the money information, and in order to prevent it, an authorization of the money information is enabled and the unfair practice such as copy or the like of the money information is prevented by a management of a time stamp.

In each terminal station in FIG. 6, it is now assumed that the user is set to A, the information provider is set to B, the charge distributor is set to C, the charge accommodator is set to D, each of them secretly holds a secret key which can be signed, and a communication partner knows the secret key which can inspect the signature (for example, a secret key of A assumes sA and a public key assumes pA). A case where A uses providing information Pi of B is now considered. Each process will be explained on the assumption that the processing result of X by the key Y is shown by $\{X\}^{\wedge}Y$ and each process of the user and the management of the key and the time stamp are performed by means in which a safety in the accounting unit 11 is guaranteed or by the memory or record of each person.

A money information obtaining process will be first explained.

(1) A adds own registered information iA (such as account number, credit number, or the like) to an input request of the money information of an amount of a yen (the unit of currency is not limited to yen) and signs by the secret key sA and sends the resultant input request to C.
MA=$\{A, \{A, iA, a, TA\}^{\wedge} sA\}$.

(2) C inspect the signature of MA by the public key pA of A and demands a money amount of a yen by using iA. If it is accepted, C signs the money information a by sC as a signature key of C every yen or every e as a fundamental unit (every 100 yen so long as the information is based on a price of a unit of 100 yen) and sends the following message to A. A different time stamp TCi is added to each message.
MC=$\Sigma\{TA, \{C, e, TCi\}^{\wedge} sC\}^{\wedge} pA$ (3) A decodes each MC by pA and, further, inspects the signature by a public key pC of C corresponding to sC. If the inspection result is correct, A records $\{C, a, TCi\}^{\wedge}$ sC to the PPC.

However, TA and TCi are time stamps and a message having the same time stamp from the same transmitter is set to an illegal request. TA or TCi is not limited to the time stamps so long as they are serial numbers or random numbers which don't accidentally coincide or seldom coincide.

A use information notifying process will now be described.

(1) When A wants to use the information Pi, if the money information in the PPC of A is larger than the use charge shown in the PIDi, the accounting unit 11 permits the use of Pi.

(2) When A finishes the use of Pi or during the use, the accounting unit 11 deletes the required use charge from the money information in the PPC.

(3) In this instance, A sends the following use notification MB to C. However, it is assumed that the deleted use charge is equal to b.
MB=$\{A, B, \{B, b, TB\}^{\wedge} sA\}$ (4) C inspects this message and when it is correct, C pays b yen as distribution money to B.

For simplicity of the processes, it is assumed in the above example that an enciphering system between C and each user is set to a public key cipher. However, it will be obviously understood that if the key is preliminarily shared, a common (secret) key cipher can be also used. A valid term of each message can be also determined by an elapsed time from the time stamp. In the above description, the sorting order among the messages is not limited and there is also a case where identifiers or time stamps of the users shown by A and B or the like are not always necessary. Further, the procedures of the foregoing money information obtaining process and use information notifying process are shown as an example. All of constructions for performing the accounting process by using the electronic information as money information without using the user peculiar data are incorporated in the invention.

When the device doesn't have the communication I/F 19, the user asks the charge distributor 18 such as a sales store or the like to input money information to be stored into the PPC. The accounting unit 11 records the use record of the providing information such as MB into the PPC and, when the money information is supplemented and inputted in the PPC at the charge distributor 18 such as a sales store or the like, a supplementing device collects the use record, so that the charge can be distributed in accordance with a use frequency. Since such electronic money information is the special data that can be processed by only the charge distributor 18 as mentioned above, in order to use the PPC, the user who doesn't have the communication I/F 19 certainly needs to intervene the charge distributor such as a sales store or the like. Therefore, the use record can be certainly collected and the charge can be distributed in accordance with the use frequency.

Figure 7:
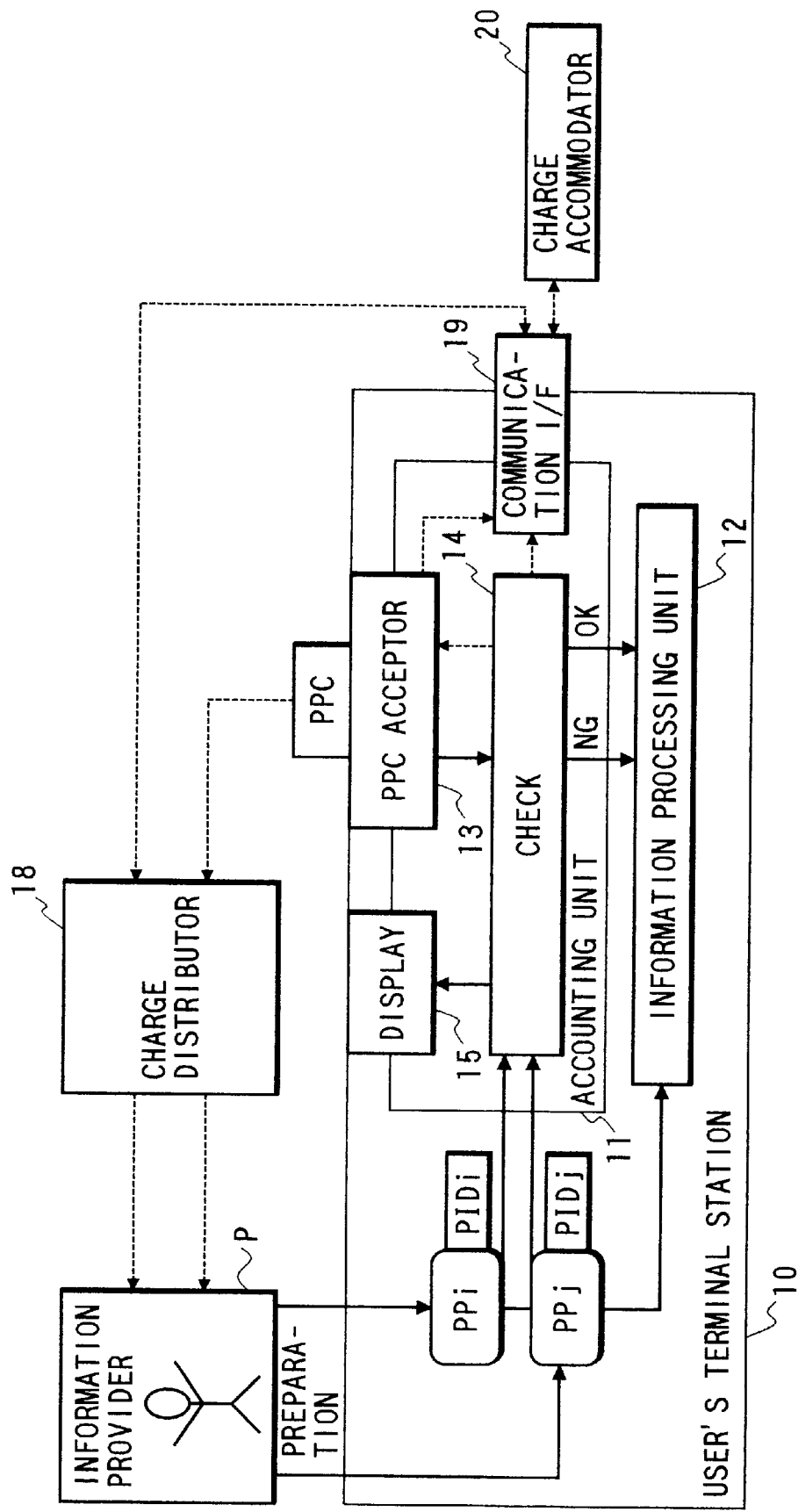
FIG. 7 is a block diagram showing the fifth embodiment of the invention.

A case where the PPC is an electronic card such as IC card or PCMCIA is shown as a fifth embodiment in FIG. 7. In this instance, money information that is stored in the PPC is data guaranteed by a bank, another financial institution, or the like or special data which can be added by only the charge distributor 18 including a sales store. The user inserts the PPC into the acceptor 13 of the PPC and executes a predetermined procedure (inspection of a personal identification number or the like), thereby enabling the PPC to be made operative. The accounting unit 11 reads out the money information from the PPC and when the money amount is larger than the charge shown in the PID (the money amount can be also displayed) or the accounting unit 11 can demand a use charge to the PPC, the checking unit 14 permits the use of the PP. In this case, even if the use charge of the PP is updated in accordance with an elapsed time, the device can be continuously used so long as the charge lies within the charge written in the PPC.

Since the money information in this case is the electronic information, input and output of the money information can be also executed by a communication by a predetermined procedure with the charge distributor 18 through the communication I/F 19. In this instance, different from the first and second embodiments, since the user doesn't directly pay the actual money to the charge distributor 18, a bank or another financial institution (hereinafter, referred to as a charge accommodator 20 in FIG. 7) which is under contract with the user guarantees a money payment of the user. Further, with respect to a notification of the use information, in a manner similar to the third embodiment, by notifying the charge distributor 18 of the present use information by using the communication I/F 19, the charge can be distributed in accordance with the use frequency. In this case, the use charge can be also directly sent to the charge distributor 18 or information provider P by electronic money information.

Specifically speaking, input and output of the electronic money information can be realized by the following communicating process. However, in consideration of a safety regarding communication and processes, it is assumed that an electronic card that is used as a PPC can execute a confirmation of the owner by a personal identification number as a security function, an access control to a data memory depending on an access condition, and enciphering and authorization by an enciphering system as will be explained hereinlater. In this instance, it is assumed that a secret key which is used for the enciphering process and authorizing process is written into a memory area which was access controlled as mentioned above and the memory area can be accessed by only a person (card issue person, charge distributor, or the like) which satisfies the access condition. The following accounting operation cannot be changed by persons other than the card issuer or charge distributor.

It is assumed that the user, information provider, charge distributor, and charge accommodator are connected as terminal devices by a network as shown in FIG. 6 mentioned above. It is now assumed that the user is set to A, the information provider is set to B, the charge distributor is set to C, the charge accommodator is set to D, C shares a secret key for an enciphering communication for each user (for instance, a secret key between A and C assumes sA and a secret key between B and C assumes sB), and C secretly holds the secret key sC for a signature which is known by only himself and opens the check key pC for the signature corresponding to it to the public. A case where A uses the providing information Pi of B is now considered. However, it is assumed that an enciphering sentence by a key Y of a plane sentence X is expressed by $\{X\} \wedge Y$ and all of the processes of the user are executed in the PPC having the security function as mentioned above.

A money information obtaining process of the embodiment will now be described.

(1) A adds own registered information iA (account number, credit number, or the like) for D to an input request of the money information corresponding to a yen (the unit of currency is not limited to yen) and sends the resultant input request to C.

MA=$\{A, \{A, iA, a, TA\} \wedge sA\}$ (2) C decodes the enciphering portion of MA by sA shared with A and demands a yen to D by using iA. If the demand is accepted, C signs to the money information a by sC as a signature key of C and sends the following message to A.

MC=$\{TA, \{C, a, TC\} \wedge sC\} \wedge sA$ (3) A decodes MC by pA and, further, inspects the signature by the public key pC of C corresponding to sC. Only when the inspection result is correct, the PPC of A adds the money information of a yen. However, TA and TC are time stamps and the message having the same time stamp from the same transmitter assumes an illegal request. TA and TC are not limited to the time stamps so long as they are serial numbers or random numbers which don't accidentally coincide or seldom coincide.

A use information notifying process of the embodiment will now be described.

(1) When A wants to use the information Pi, if the money information in the PPC of A is larger than the use charge shown in PIDi, the accounting unit 11 permits the use of Pi.

(2) When A finishes the use of Pi or during the use, the accounting unit 11 subtracts the required use charge from the money information of the PPC and writes the result into the PPC.

(3) In this instance, A sends the following use notification to C. However, it is assumed that the subtracted use charge is equal to b.

MB=$\{A, \{A, B, b, TB\} \wedge sA\}$ (4) C decodes this message and when it is correct, C pays b yen as distribution money to B.

Subsequently, when the information between A and B is also transmitted and received by an enciphering communication, it is sufficient that the next process is executed at a timing between the foregoing money information obtaining process and use information notifying process. It is now assumed that C also shares the secret key together with the information provider.

An information using process of the embodiment will now be described.

(1) A sends the following message to C in order to request C to form a conversation key with B.
MA'={A, B, TA'}

(2) C forms a conversation key CK and sends the following message to A.
MC'={{TC', A, CK} ^ sB, TA', B, CK} ^ sA (3) A decodes MC' by sA and sends {TC', A, CK} ^ sB to B.

(4) B decodes the received message by sB and sends the information enciphered by the conversation key CK to A.

(5) A decodes the enciphering information by the conversation key CK.

Although the enciphering system between C and each user is a common key encipher in order to simplify the processes in the above example, it will be obviously understood that a public key encipher can be used in a manner similar to the foregoing embodiment. A valid term of each message can be also determined by an elapsed time from the time stamp. In the above description, the sorting order among the messages is not limited and there is also a case where identifiers and time stamps of the users shown by A and B or the like are not always necessary. Further, the procedures for the money information obtaining process and use information notifying process mentioned above are shown as an example. All of the constructions in which the accounting process is executed by using the electronic information as money information without using the user peculiar data are incorporated in the invention.

When the device doesn't have the communication I/F, the user asks a charge distributor such as a sales store or the like to input money information to be stored into the PPC. The accounting unit records the use record of the providing information into the PPC and, when the money information is supplemented and inputted into the PPC at the charge distributor such as a sales store or the like, the supplementing device collects the use record, so that the charge can be distributed in accordance with the use frequency. Since such electronic money information is special data which can be processed by only the charge distributor as mentioned above, the user who doesn't have the communication I/F certainly needs to intervene the charge distributor such as a sales store or the like. Therefore, the use record can be certainly collected and the charge can be distributed in accordance with the use frequency.

Figure 8:
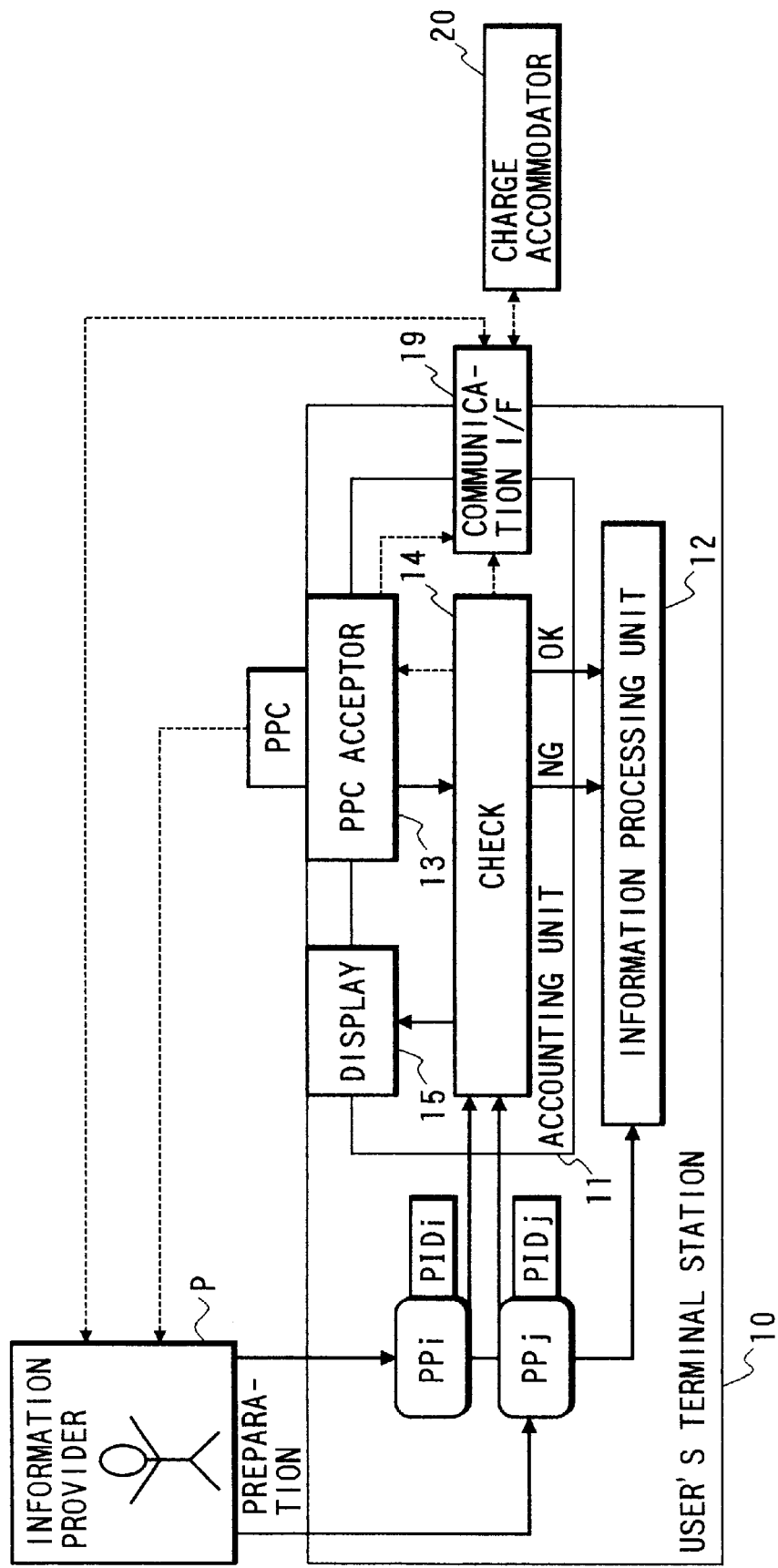
FIG. 8 is a block diagram showing the sixth embodiment of the invention.

The sixth embodiment shows an accounting system in which electronic information is used as money information in a manner similar to the fifth embodiment and the charge distributor is unnecessary and will be explained hereinbelow with reference to FIG. 8.

Figure 10:
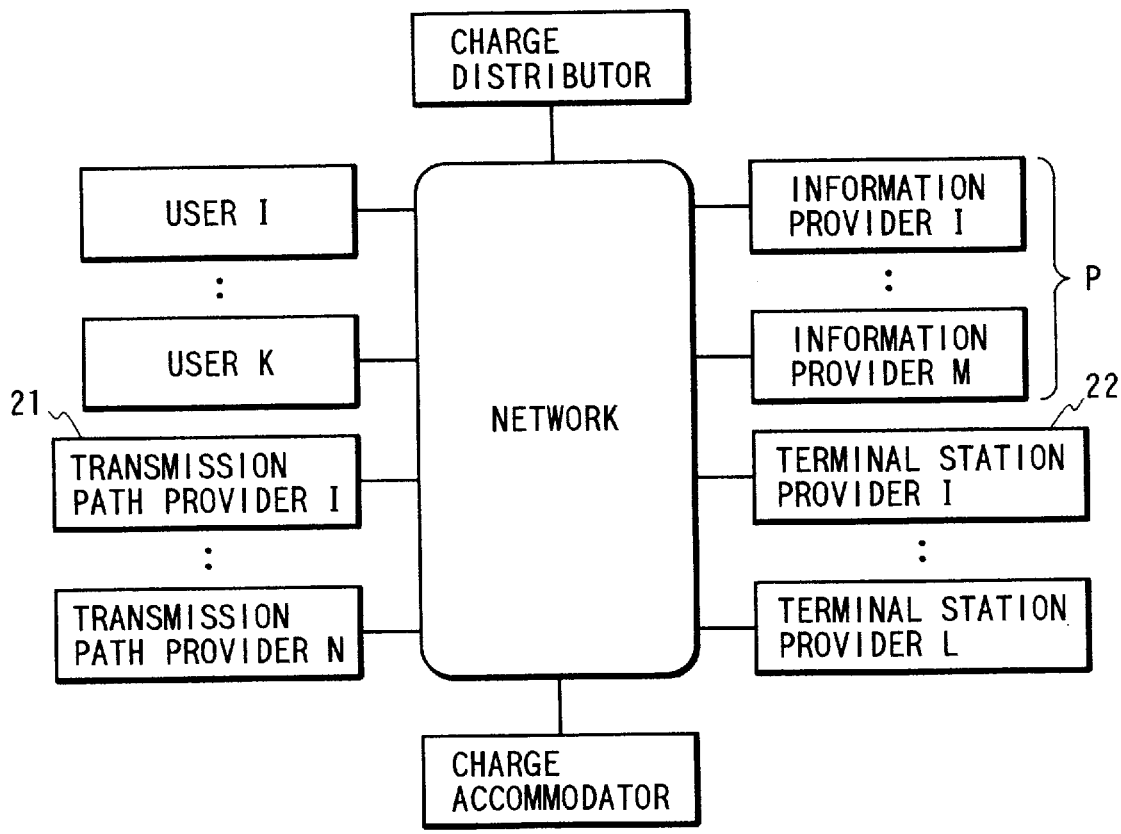
FIG. 10 is a block diagram showing a network in the ninth to fourteenth embodiments of the invention.

It is assumed that the user, information provider, and charge accommodator are connected by a network as shown in FIG. 10. It is, further, assumed that the electronic card which is used as a PPC can perform a confirmation of the owner by a personal identification number as a security function, an access control to a data memory by an access condition, and enciphering and authorization by an enciphering system as will be explained hereinlater. In this instance, it is assumed that the secret key which is used for enciphering process and authorizing process has been written in a memory area which was access controlled as mentioned above. It is also assumed that the following accounting operation cannot be changed by persons other than the issuer of the card or charge distributor.

Figure 9:
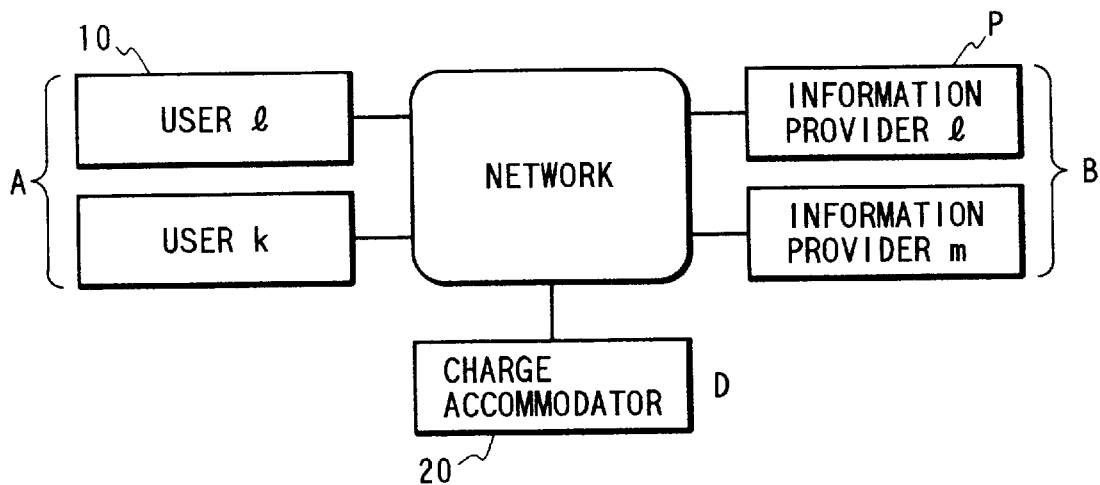
FIG. 9 is a block diagram showing a network in the sixth embodiment shown in FIG. 8.

As shown in FIG. 9, it is assumed that the user is set to A, the information provider is set to B, the charge accommodator is set to D, each of them secretly holds the secret key which can be signed, and a communication partner knows the public key which can inspect the signature (for example, the secret key of A assumes sA and the public key assumes pA). A case where A uses the providing information Pi of B will now be considered. However, it is assumed that the processing result by the key Y of X is expressed by {X} ^ Y and all of the processes of the user are executed in the PPC having the security function as mentioned above.

An example of money information obtaining information of this embodiment is as follows.

(1) A adds own registered information iA (account number, credit number, or the like) to an input request of money information of a yen (the unit of currency is not limited to yen), signs by the secret key sA, and sends the resultant input request to D.
MA={A, {A, iA, a, TA} ^ sA}

(2) D inspects the signature of MA by the public key pA of A. When iA is correct and A can pay a yen, D signs the money information a by sD and sends the following message to A.
MD={TA, {D, a, TD} ^ sD} ^ sA (3) A inspects MD by pA and further inspects the signature by the public key pD corresponding to sD. Only when the inspection result is correct, the PPC of A adds the money information of a yen.

However, TA and TD are the time stamps and the message having the same time stamp from the same transmitter is an illegal request. TA and TD are not limited to the time stamps so long as they are serial numbers or random numbers which don't accidently coincide or seldom coincide.

A use information notifying process of the embodiment will now be described.

(1) When A wants to use the information Pi, if the money information in the PPC of A is larger than the use charge shown in PIDi, the accounting unit permits the use of Pi.

(2) When A finishes the use of Pi or during the use, the accounting unit subtracts the required use charge from the money information of the PPC and writes the result into the PPC.

(3) In this instance, A sends the following use notification MB to B. The subtracted use charge assumes b.
MB={A, B, {B, b, TB} ^ sA}

(4) B inspects the signature and when it is correct, B shows the signature {B, b, TB} ^ sA of A to D and receives the charge of b yen.

Subsequently, when the information between A and B is also transmitted and received by an encrypted communication, the encrypted communication by the public key can be also directly executed by the public key of a partner. However, when an information amount is large, the enciphering communication by the common key encipher can be also executed as follows. In this case, it is assumed that common key enciphering means is shared between each user and the information provider. However, A and B in the above processes (1) and (2) may be reversed.

An information using process of this embodiment is as follows.

(1) A enciphers the common key CK with B by the public key pB of B and sends.
MA'={A, B, CK, TA'} ^ pB (2) B decodes the received message by sB.

(3) B sends the information which was common key enciphered by the common key CK to A.

(4) A decodes the common key enciphered information by the common key CK.

For simplicity of the processes, although the enciphering system among D, each user, and information provider has been set to the public key encipher in the above example, the common key encipher as mentioned above can be also obviously used. A valid term of each message can be also determined by an elapsed time from the time stamp. In the above example, the sorting order among the messages is not limited, and there is also a case where identifiers and time stamps of the users shown by A and B or the like are not always necessary. Further, the procedures of the foregoing money information obtaining process and use information notifying process are shown as one example. All of the constructions such that the accounting process is executed by using the electronic information as money information without using the user peculiar data are incorporated in the invention.

The seventh embodiment of the invention will now be described.

By the accounting system using actual money shown in the second embodiment, it is possible to realize an accounting system such that in a facility in which terminal stations are installed, an information provider or charge distributor carries on business and many persons freely use the installed terminal stations by paying money like a public telephone, a game center, a coffee shop, or a library.

By the accounting system using the prepaid card shown in the third embodiment, it is possible to realize an accounting system such that the information provider widely distributes providing information by a CD-ROM, a personal computer communication, or the like, an institution such as a copyright society for information becomes a charge distributor and forms and sells a prepaid card, and the user purchases the prepaid card via a sales store or the like and uses the providing information at home or by other terminal stations or the like.

By the accounting system using the floppy disk shown in the fourth embodiment, it is possible to construct an accounting system such that a special acceptor is not needed for the PPC in the third embodiment (it is assumed that the acceptor of the floppy disk is ordinarily provided for the user's terminal station) and, further, the sales store can be omitted by the transmission and reception by the communication of money information, and by executing the enciphering and authorizing processes in a software manner, the system can be easily realized by the present network.

By the accounting system using the electronic card such as IC card, PCMCIA, or the like shown in the fifth embodiment, it is possible to realize an accounting system in which the accounting system using the foregoing fourth embodiment is further made safe.

By the accounting system shown in the sixth embodiment, it is possible to realize an accounting system in which a charge distributor is unnecessary, namely, the user and the information provider directly perform a transaction via a charge accommodator. The accounting method and accounting system can be also obviously applied to electronic cash in which certain special data is treated in a manner similar to money and which is considered to be able to be put into practical use in future.

Various accounting systems in which the foregoing accounting methods and accounting systems are combined are also incorporated in the invention.

The eighth embodiment of the invention will now be described.

At present, there is known an accounting system such that an information provider enciphers many information by different keys and stores the enciphered information into a CD-ROM or the like, the CD-ROM itself as a medium is cheaply sold through a sales store, and when the information provider notifies the user of the enciphering key of the designated information in accordance with a request from the user, a use compensation of the information is demanded. According to this system, however, although the sales store which sells the CD-ROM can obtain a sales profit as a medium, there is a problem such that a profit for the sales of the use information is not obtained. Therefore, the accounting system by the PPC shown in the invention is used for the purchase of the information instead of the rental use of the information, so that the above problem can be solved. That is, simultaneously with the purchase of the CD-ROM at the sales store, the user buys the PPC such as a prepaid card or the like and designates a payment by the prepaid card when knowing the enciphering key by a communication (via a telephone or the like) with the information provider, so that the information provider collects the use charge from the sales store who sold the prepaid card. Thus, even as for a flow of use charge of the information, it is performed via the sales store, so that the sales store can obtain a profit for the information use. However, the accounting unit is constructed in a manner such that the money information of the PPC is inspected and if the use of the information is possible, the charge is subtracted from the PPC only when the enciphering for the information is decoded. Further, it is assumed that the PPC can be converted into money when it is not used. In this instance, the PPC is produced for every information provider and is sold via the sales store in a manner similar to the CD-ROM. In this embodiment, therefore, the charge distributor is unnecessary.

In the third embodiment, by constructing the use information notifying process as follows, the use information notifying process of the prepaid card can be also made safe. However, an identification number iP of each prepaid card and a secret key sP corresponding to the ID number iP have been registered in the prepaid card.

A use information notifying process of this embodiment will now be described hereinbelow.

(1) When the money information in the PPC of A is larger than the use charge shown in PIDi, the checking unit permits the use of the information Pi.

(2) When A finishes the use of Pi or during the use, the checking unit subtracts the required use charge from the money information of the PPC and writes the result into the PPC.

(3) In this instance, the checking unit sends the following use notification to C. The use charge to B assumes b.
MB={iP, {B, b, iP, TB} ^ sP}

(4) C decodes the secret key sP in which MB has been registered. When this message is correct, C pays b yen as distribution money to B.

Thus, persons other than the person who knows iP and sP cannot form the use notification.

In the multimedia network, as shown in FIG. 10, it is predicted that in addition to the information provider P, a transmission path provider 21 corresponding to the network itself, a terminal station provider 22 since it is required that the terminal station has a high quality, and the like exist. It is, thus, necessary for the user to pay a charge even with respect to not only the information but also their use. Although they can be processed by different accounting systems, therefore, it is convenient that they are processed by one accounting system and if they are accounted on a unit basis of the information used, a finer accounting operation can be performed.

An accounting system in which a charge distribution to all of the providers regarding the network is executed on an information unit basis will now be described as a ninth embodiment of the invention.

According to the accounting systems shown in the first to eighth embodiments, the accounting is performed on the basis of the PID which is set by the information provider and the PPC as money information and the accounted money is distributed to the information provider directly or via the charge distributor in accordance with the use. Therefore, if the providers 21 and 22 such as transmission path, terminal station, and the like can annex the information corresponding to the PID to the providing information, a fair charge can be distributed to each provider including the information provider by a similar method.

Figure 11:
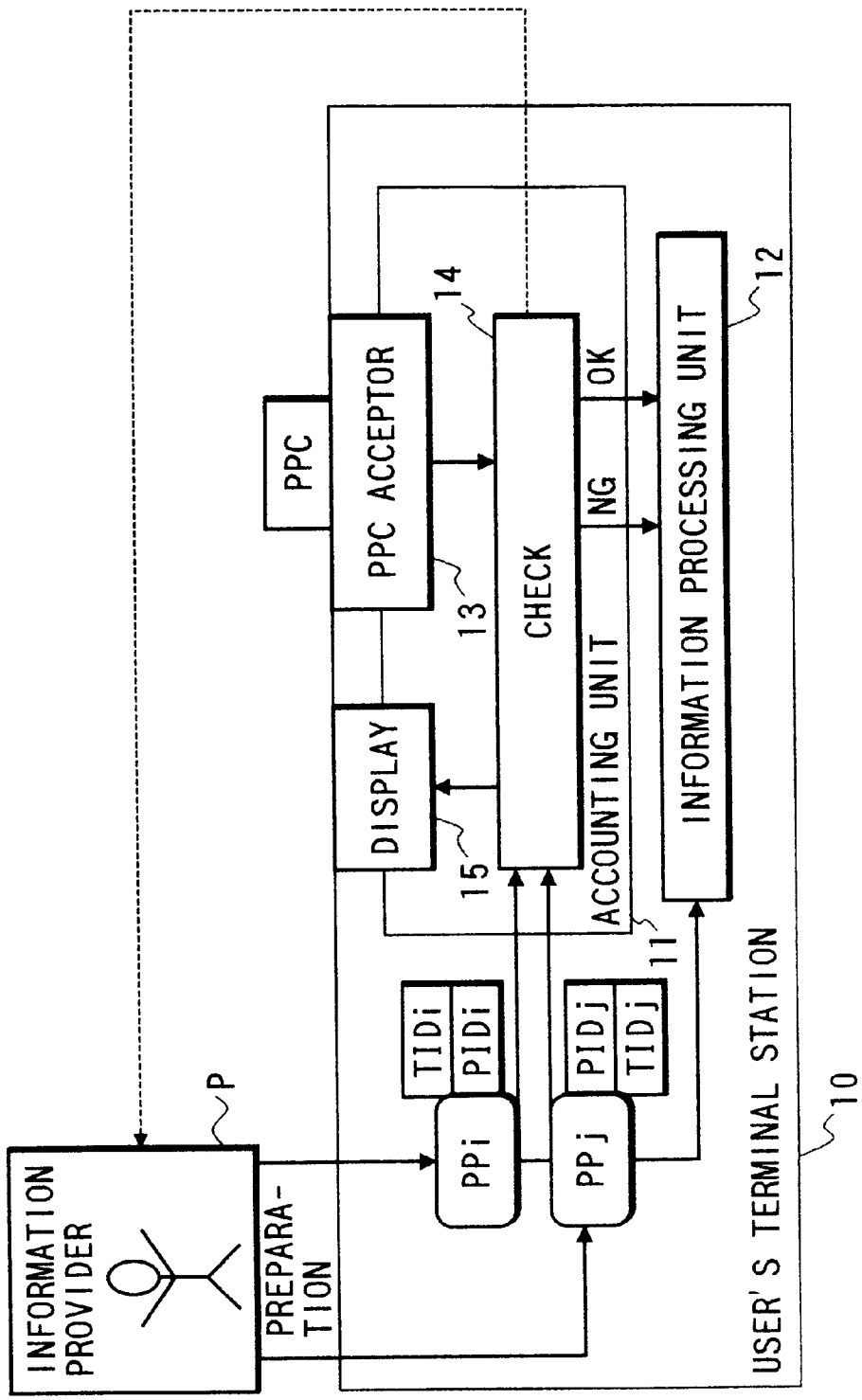
FIG. 11 is a block diagram showing the ninth embodiment of the invention.

A system of realizing the distribution of an account to all of the providers will now be described with reference to FIG. 11. In FIG. 11, P denotes the information provider; PPi (or PPj) the providing information as onerous information which is provided by P; PIDi (or PIDj) the information peculiar data that is peculiar to PPi; PPC the money information; and 14 the checking unit about the permission or inhibition of the use in a manner similar to those described above. TIDi (or TIDJ) denotes the annexed data regarding the use of the transmission path and terminal station which are set by the transmission path provider 21, terminal station provider 22, and the like.

The information provider P and/or each provider annexes each annexed data TID including the PID to the providing information PP (they can be also considered as one data in a lump). The user's terminal station 10 is constructed such that, when using the providing information PP, the information certainly passes through the accounting unit 11. The acceptor 13 of the PPC as money information is provided for the accounting unit 11. When a use request of the providing information PP occurs, the checking unit 14 checks a use possibility of the providing information on the basis of the information of at least a part of the PID, TID, and PPC. For example, a check is made to see if the total of the use charges shown in the PID and TID lies within the money information of the PPC. Information indicative of the result about whether the use is OK or not is notified to the user's terminal station 10. If OK, the user's terminal station 10 can use the providing information PP. In this instance, information (use charge of the providing information PP, balance of the PPC, or the like) about the PID, TID, and PPC is displayed on the display unit 15. The check result of the checking unit 14 can be also shown in the display unit 15.

Money information PPC may be any one of the actual money, the prepaid card such as a telephone card, and electronic information that is equivalent to the money stored in a floppy disk, an IC card, a PCMCIA, or the like. In the invention, the permission or inhibition of the use of the providing information PP is discriminated by the money information PPC which doesn't exist in the user in place of user peculiar data USERID of each user. Therefore, the problems of (1) to (3) are solved in a manner similar to the first to eighth embodiments. However, in FIG. 11, although the description about the communication I/F has been omitted for simplicity of explanation, it is also possible to add the communication I/F and to communicate with the charge distributor or charge accommodator in a manner similar to the other embodiments.

With respect to the problem of (4), the TID has the same meaning as the PID except that only the provider differs and the user also pays the charge regarding the TID from the PPC as mentioned above. Therefore, if the charge distributor (or by the direct communication) distributes the charge to each provider in accordance with the use of the TID, the fair charge is paid to all of the providers regarding the network. Thus, the problem of (4) is solved.

As a specific example, by writing the charge according to the line use time of the providing information to the TID, the transmission path provider can legally obtain the charge according to the use of the line. By writing the charge per kind such as use time, use line, or the like into the TID, a fine accounting can be also performed. In this instance, it is sufficient that the transmission path provider allows a connector or the like for connecting the information provider and the network to execute a process for annexing the TID. (The connector also includes a connector existing in a transmission path such as hub or gateway.) In a case of the use charge of the CPU or terminal station as well, by similarly writing the charge according to the use time and process into the TID, the charge of the CPU or terminal station can be legally obtained.

A specific example of the accounting about various cases will be further explained hereinbelow.

The tenth embodiment shows an example of an accounting regarding an image compression.

In a coding of image information, there is a hierarchical coding as a coding method for coping with image processing apparatuses having different resolutions or efficiently executing an image retrieval in an image database. An outline of the hierarchical coding will now be described hereinbelow. First, a reduced image which coarsely shows a whole image is encoded and differential information for sequentially enlarging the reduced image is subsequently encoded. Thus, a scalable coding which can cope with different resolutions can be realized. For example, it is possible to execute processes such that a reduced image having a small number of pixels is used and displayed on a monitor at a high speed, a detailed image having a large number of pixels is outputted by using all information for printing, or the like.

Figure 12:
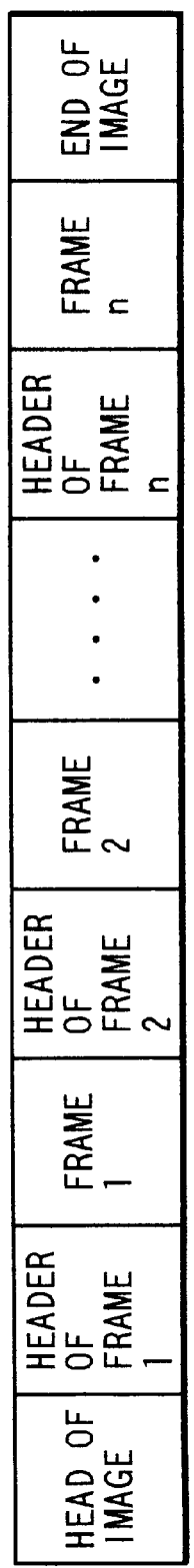
FIG. 12 is a diagram for explaining a hierarchical coding.

FIG. 12 shows a general conceptual diagram of the hierarchical coding data. In FIG. 12, the head of an image is a header indicative of the start of one whole image information. A header of a frame 1 denotes a bit pattern indicative of the start of the frame 1. The frame 1 is information of a hierarchy 1 in which the most reduced image of the original image is encoded. A header of a frame 2 is a bit pattern indicative of the start of the frame 2. The frame 2 is information of a hierarchy 2 as differential information to enlarge the image of the hierarchy 1, . . . , and a header of a frame n is a bit pattern indicative of the start of the frame n. The frame n is information of a hierarchy n as differential information to enlarge an image of a hierarchy n−1.

As a typical system, a hierarchical coding system of JPEG (refer to ISO/IEC 10918-1, 10918-2, or ITU-T T.81, T.83) or the like has been known. Such a coding technique is often used in a multimedia network.

In the embodiment, a resolution by such a hierarchical coding as a TID will now be described as an example. The resolution is data that is not peculiar to the information. Namely, even in the same one information, resolutions by the hierarchical coding of the information which is sent through the transmission path differ depending on a traffic of the transmission path, a resolution of the monitor of the user, a precision of the data retrieval, or the like. Therefore, it is now assumed that the TID indicates a resolution of the hierarchical coding when the providing information is sent and a charge or the like about it. For example, even in the same information, a charge which is written in the TID in case of transmitting at a coarse resolution of the hierarchy 1 and a charge which is written in the TID in case of transmitting at a precise resolution of the hierarchy n are different. It is also possible to construct in a manner such that in the transmission itself, the whole information is transmitted at a precise resolution of the hierarchy n and when it is decoded or displayed, the resolution is set to a resolution of up to the hierarchy according to an ability of a decoder or a display unit. In this case, the charges for all of the hierarchies are shown in the TID and the accounting can be also performed in accordance with the hierarchy used.

Figure 13:
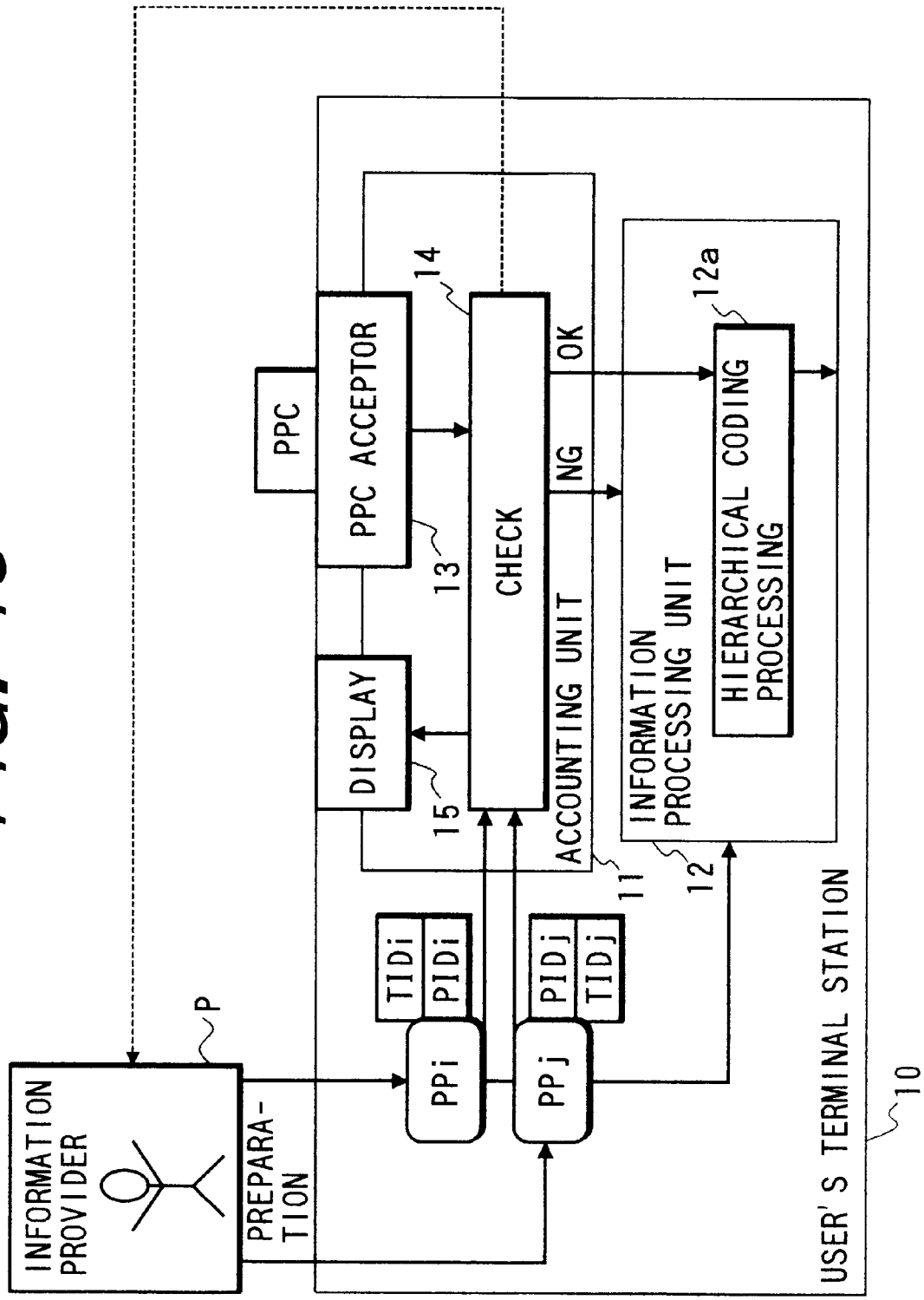
FIG. 13 is a block diagram showing the tenth embodiment of the invention.

The accounting operation in the embodiment will now be described with reference to FIG. 13. In FIG. 13, the user inserts the PPC into the acceptor 13 of the PPC, reads out the money information from the PPC, and when the money amount is larger than the total of charges shown in the PID and TID (the money amount can be also displayed) and the accounting unit 11 can demand the use charge to the PPC, the checking unit 14 permits the use of the PP. However, when all of the hierarchy data is sent and is decoded at the designated resolution, there is input means (not shown) such as a keyboard or the like for inputting the designated resolution to the accounting unit 11. By such input means, the charge about the TID is discriminated. Further, it is also possible to construct in a manner such that even when the charge by the PID of the PP, the charge by the TID, or the like is updated in accordance with an elapsed time, the device can be continuously used so long as the updated charge lies within the charge written in the PPC. As described in the other embodiments, the PPC may be any one of the actual money and the prepaid card by a paper card or an electronic card.

When the use of the PP is permitted by the checking unit 14, data regarding the resolution written in the TID is sent together with the PP to a hierarchical coding processing unit 12a. The hierarchical coding processing unit 12a executes a decoding process of the hierarchical coding corresponding to the resolution. Even in the case where the PP includes all of the hierarchy data and the user or terminal station designates the decoding resolution, the designated resolution is sent together with the PP to the hierarchical coding processing unit 12a. The hierarchical coding processing unit 12a executes the decoding process of up to the hierarchy corresponding to the designated resolution. As a hierarchical coding processing unit 12a, a well-known processing apparatus of a hierarchical coding system of JPEG can be also used.

With respect to the distribution of the charge, means similar to the other embodiments can be used. For this purpose, the communication I/F can be also added to the terminal station shown in FIG. 13.

In many cases, the hierarchical coding processing unit is developed by the transmission path provider 21 or the like different from the information provider P. Therefore, the transmission path provider 21 provides a coding processing unit of the hierarchical coding to the information provider P together with the TID. When the information provider provides the information together with the PID while annexing to the PP or if the information provider P and the network are connected by a connector or the like that is provided by the transmission path provider 21, the connector executes the hierarchical coding process when the providing information PP including the PID is transmitted to the transmission path through the connector and, in this instance, it is also possible to annex to the PP. (The connector can be also provided in the transmission path like a hub.) In the case where a certain institution like an information center collects information from the information provider P and provides the information in a lump, the center can execute the hierarchical coding solely or in cooperation with the transmission path provider 21 and can set the TID (there is also a case where the center also functions as a transmission path provider 21 and charge distributor 18).

With respect to the distribution of the charge, in addition to the information regarding the PID, if the user also notifies the charge distributor of the information about the TID, it is sufficient for the charge distributor to distribute the charge to the transmission path provider in accordance with the use of the notified TID in a manner similar to the methods in the other embodiments. Therefore, as a method of distributing the charge, the methods mentioned in the other embodiments can be used. However, although a case where the transmission path provider develops the hierarchical coding processing unit has been described for simplicity of explanation, in the other cases, the charge is distributed to the legal provider.

The eleventh embodiment shows an example of an accounting regarding an image compression.

The MPEG is known as a coding system for efficiently accumulating and transmitting motion image information. The MPEG system is based on the international standard having an object such that a motion image is high efficiently coded and is a system for executing a further high efficient coding by using frequency characteristics of data and human visual sense characteristics and by using a redundancy in the time base direction that is peculiar to the motion image. The MPEG system includes: MPEG1 in which a transfer rate is set to maximum 1.5 Mbps for digital storage media; and MPEG2 in which an upper limit of a transmission rate is eliminated and it is planned that it is used for all of the transmission systems of a bidirectional digital multimedia equipment, a digital VTR, an ATV, an optical fiber network, and the like. However, since their fundamental algorithms are almost similar, a principle of the coding system and a data structure will now be described with respect to the MPEG1 as a base.

Figure 14:
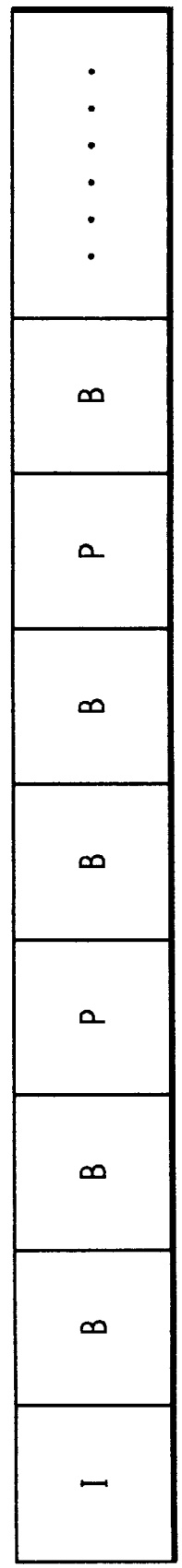
FIG. 14 is a diagram for explaining a coding by the MPEG.

The principle of the high efficient coding system by the MPEG will be first explained. In the high efficient coding system, by obtaining a difference between the frames, the redundancy in the time base direction is reduced, the resultant differential data is subjected to DCT and variable length coding processes, and the redundancy in the spatial direction is reduced, thereby realizing a high efficient coding as a whole. As for the redundancy in the time base direction, in case of a motion image, attention is paid to that a correlation among the continuous frames is high and by obtaining a difference between the target frame to be coded and the frame that is preceding or subsequent with regard to the time, the redundancy can be reduced. In the MPEG, therefore, as shown in FIG. 14, in addition to an intra-coding image (I-picture) which is mainly obtained in a coding mode for coding in the frame, a predictive coding image (P-picture) for coding a difference value between the target frame and the frame that is preceding with respect to the time and a bidirectional predictive coding image (B-picture)

for coding either one of the difference value having the smallest data amount in the difference value between the target frame and the frame that is preceding or subsequent with respect to the time and the difference value between the target frame and the frame interpolated from both frames are provided. The frames according to those coding modes are combined in accordance with a predetermined order.

In the MPEG, one unit (GOP) is constructed by one I-picture, four P-pictures, and ten B-pictures mentioned above, and a combination such that one I-picture is arranged at the head and two B-pictures and one P-picture are repetitively arranged is recommended. By arranging the I-picture at a predetermined period, a special reproduction such as a reverse reproduction or the like and a partial reproduction based on the unit of such a GOP are enabled and an error propagation is prevented. When a new object appears in the frame, there is a case where by getting a difference between the target frame and the frame that is subsequent with respect to the time rather than by getting the difference between the target frame and the frame that is preceding with respect to the time, the difference value is reduced. Therefore, in the MPEG, the bidirectional predictive coding as mentioned above is executed and a higher efficient compression is performed.

In the MPEG, a motion compensation is executed. Namely, one block is formed by (8 pixels×8 pixels), a predetermined block (macro block) unit is constructed by collecting four such blocks with respect to luminance data and two such blocks with respect to color difference data, a difference between a target macro block and a macro block near the corresponding block of the preceding or subsequent frame is obtained, and the macro block with the smallest difference is searched, thereby detecting a motion vector and coding the motion vector as data. Upon decoding, the data of the corresponding macro block of the preceding or subsequent frame is extracted by using the motion vector, thereby decoding the coded coding data by using the motion compensation. At the time of the motion compensation as mentioned above, after the frame that is preceding with respect to the time was once coded, the frame is again decoded and the resultant frame is used as a preceding frame. The motion compensation is executed by using the macro block in such a preceding frame and the target frame to be coded. Although the motion compensation between the frames is carried out in the MPEG1, the motion compensation between the fields is performed in the MPEG2. The differential data and motion vector obtained by the motion compensation as mentioned above are further high efficient coded by a DCT transformation and a Huffman coding as already described above.

A data structure of the MPEG system will now be described. The data structure is constructed by a hierarchical structure comprising a video sequence layer, a GOP layer, a picture layer, a slice layer, a macro block layer, and a block layer. Explanation will now be made hereinbelow in accordance with the order from the lower layer.

First, the block layer is constructed by (8 pixels×8 pixels) each for luminance data and color difference data in a manner similar to the foregoing JPEG and the DCT is performed every such unit. The macro block layer is constructed by combining four blocks each comprising (8 pixels×8 pixels) mentioned above with respect to the luminance data and one such a block with respect to each color difference data and by adding a macro block header. In the MPEG system, the macro block is set to a unit for motion compensation and coding, which will be explained hereinlater. The macro block header includes: each data in the motion compensating and quantizing steps of each macro block unit; and data indicating whether six DCT blocks (Y0, Y1, Y2, Y3, Cr, Cb) in each macro block has data or not. The slice layer is constructed by one or more macro blocks which are continuous in accordance with the scanning order of an image and a slice header. The quantizing steps in the series of macro blocks in the same slice layer can be made constant. In the slice header, each slice header has data about the quantizing step in each slice layer and when there is no quantizing step data that is peculiar to each macro block, the quantizing steps in the slice layer are made constant. In the head macro block, the difference value of a DC component is reset. The picture layer is constructed by collecting a plurality of slice layers mentioned above on a frame unit basis and is constructed by: a header comprising a picture start code or the like; and one or a plurality of slice layers subsequent to the header.

The header includes a code (coding identification code) indicative of a coding mode of the image and a code indicative of a precision (about whether a unit is set to a pixel unit or a half pixel unit) of a motion detection. The GOP layer is constructed by: a header such as group start code, time code indicative of an elapsed time from the beginning of the sequence, or the like; and a plurality of I frames, B frames, or P frames subsequent to the header. The video sequence layer starts from a sequence start code and finishes by a sequence end code. Control data necessary for decoding such as image size, aspect ratio, and the like and a plurality of GOPs in which the image sizes and the like are equal are arranged between the sequence start code and the sequence end code. In the MPEG system having such a data structure, a bit stream is specified by its standard. Such a coding technique is often used in the multimedia network.

In this embodiment, explanation will now be made hereinbelow with respect to picture information by such an MPEG as an example of the TID. The picture information is data which is not peculiar to a given body of information. Namely, even in a case of the same information, a coding efficiency of the MPEG that is required differs in dependence on a traffic of a transmission path, a resolution of a monitor, or the like. Therefore, it is assumed that the TID shows an information degree regarding the picture of the MPEG when the providing information is sent, a charge regarding it, and the like. For example, even in the case of the same information, a charge which is written in the TID and is required for a motion image transmission like a frame feed in which a transmission amount of the P-picture and B-picture is reduced and a charge which is written in the TID and is required for a motion image transmission using all of the pictures are different. It is also possible to construct in a manner such that all of the pictures are sent in the transmission itself and when they are decoded or displayed, the decoding by the picture designated in accordance with the ability of a decoder or display means is executed. In such a case, it is sufficient that a charge for all of the pictures is shown in the TID and an accounting is carried out in accordance with the picture used.

Figure 15:
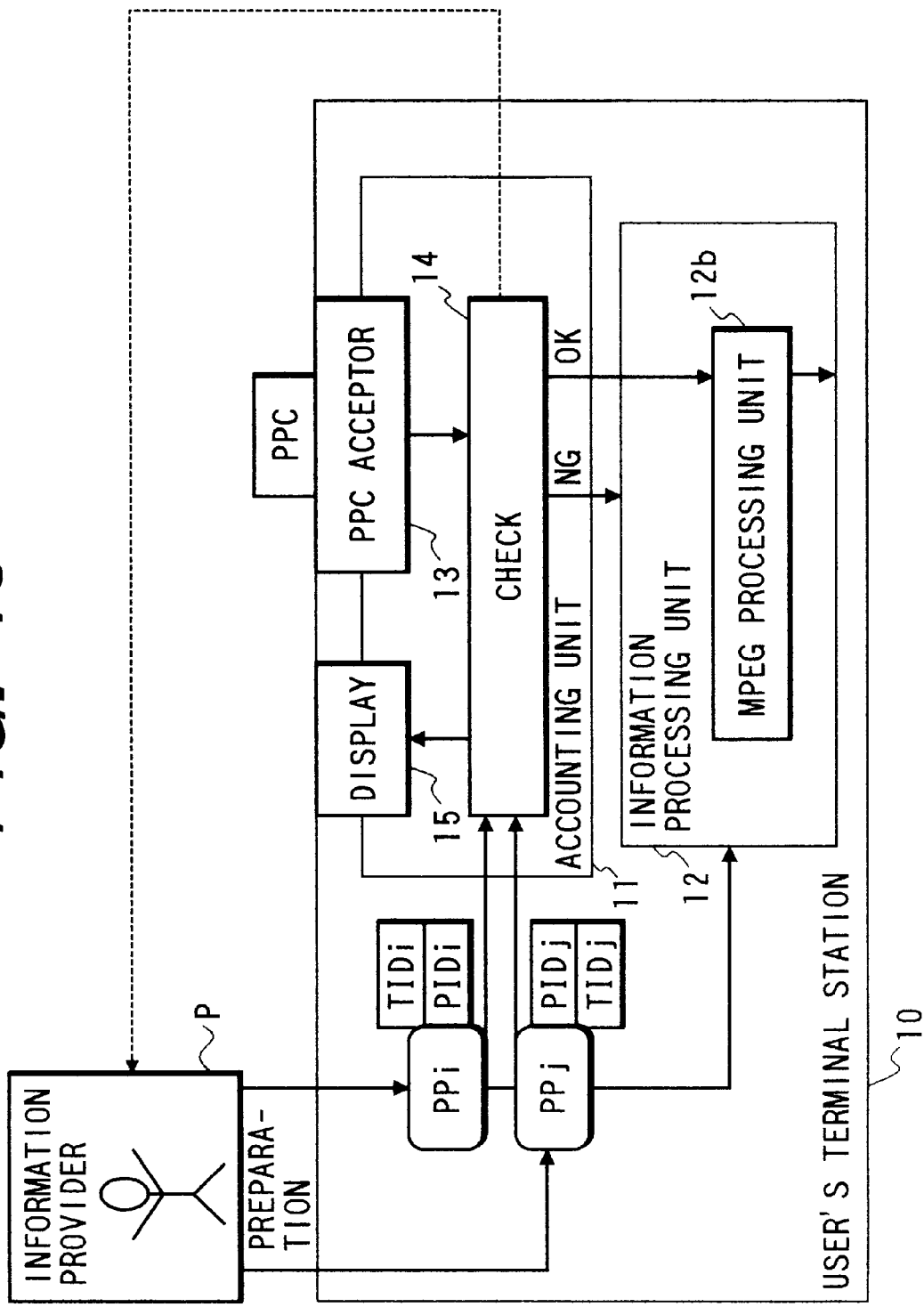
FIG. 15 is a block diagram showing the eleventh embodiment of the invention.

The accounting operation according to this embodiment will now be described with reference to FIG. 15. In FIG. 15, the user inserts a PPC into the acceptor of the PPC and reads out money information from the PPC. When the money amount is larger than the charge shown in the PID or TID (the money amount can be also displayed) and when the accounting unit 11 can demand a use charge to the PPC, the checking unit 14 permits the use of the PP. However, when all of the pictures are sent and the decoding is executed by the designated picture, there is means such as a keyboard or the like (not shown) for inputting the picture information to be designated to the accounting unit 11 and the charge about the TID is discriminated by it. Further, it is also possible to construct in a manner such that even if the charge by the PID of the PP, the charge by the TID, or the like is updated with an elapse of time, the device can be continuously used so long as the required charge lies within the charge written in the PPC. As described in the other embodiments, as a PPC, it is also possible to use the actual money or a prepaid card by a paper or an electronic card.

When the use of the PP is permitted by the checking unit 14, the data regarding the picture written in the TID is sent together with the PP to an MPEG processing unit 12b. The MPEG processing unit 12b executes a decoding process corresponding to the picture. Even in the case where the PP includes all of the pictures and the user or terminal station designates the picture tq be decoded, the designation information is sent together with the PP to the MPEG processing unit 12b and the MPEG processing unit 12b executes a decoding process corresponding to the designated picture. The MPEG processing unit 12b is a well-known processing apparatus.

As for the distribution of the charge, means similar to those in the other embodiments can be used. For this purpose, a terminal station communication I/F shown in FIG. 15 can be also added.

Since the MPEG processing unit 12b is often developed by the transmission path provider 21 or the like different from the information provider P, if the transmission path provider provides the coding processing unit of the MPEG to the information provider together with the TID and the information provider provides information together with the PID while annexing to the PP or if the information provider and the network are connected by a connector or the like which is provided by the transmission path provider, when the providing information PP including the PID is sent to the transmission path through the connector, the connector executes the MPEG coding process and the information can be also annexed to the PP in this instance (the connector can be also provided in the transmission path like a hub). In the case where a certain institution such as an information center collects information from information providers and provides the information in a lump, the center executes the MPEG coding solely or in cooperation with the transmission path provider and can also set the TID (there is also a case where the center also serves as a transmission path provider or a charge distributor).

As for the distribution of the charge, if the user also notifies the charge distributor of the information regarding the TID together with the information of the PID, in a manner similar to the methods in the other embodiments, it is sufficient for the charge distributor to distribute the charge to the transmission path provider in accordance with the use of the notified TID. Therefore, as a method of distributing the charge, the methods mentioned in the other embodiments can be used. Although the embodiment has been described on the assumption that the transmission path provider develops the MPEG processing unit for simplicity of explanation, in the other cases, the charge is distributed to the legal provider.

Although the embodiment has been described with respect to the MPEG as an example, all of the methods of accounting by using the PPC with respect to the coding by the difference on the time base are included in the embodiment.

The twelfth embodiment relates to the accounting for an enciphering technique for preventing that the providing information is used by persons other than the designated user.

Since the multimedia network treats various information, a processing speed and safety which are required largely differ in dependence on the kind of information. For example, in case of data such as a motion image in which a capacity is large and a high real-time speed is required, a high speed enciphering process is required. In case of non-real-time data of a small capacity such as represented by a document or software, it is desired to reduce a load about the enciphering process by decreasing an enciphering processing speed. On the contrary, as for data such as a motion image in which a capacity is large and a high real-time speed is required, there are many cases such that it is sufficient to execute an enciphering process of low safety like a scramble. As for non-real-time data of a small capacity such as a document or software, there are many cases such that a high enciphering process of a high safety is demanded. It is, therefore, desired that an accounting corresponding to a processing speed and safety which are required can be realized.

In the embodiment, a case where a charge for such a processing speed or power of the encipher is shown as a TID will now be described hereinbelow as an example.

Figure 16:
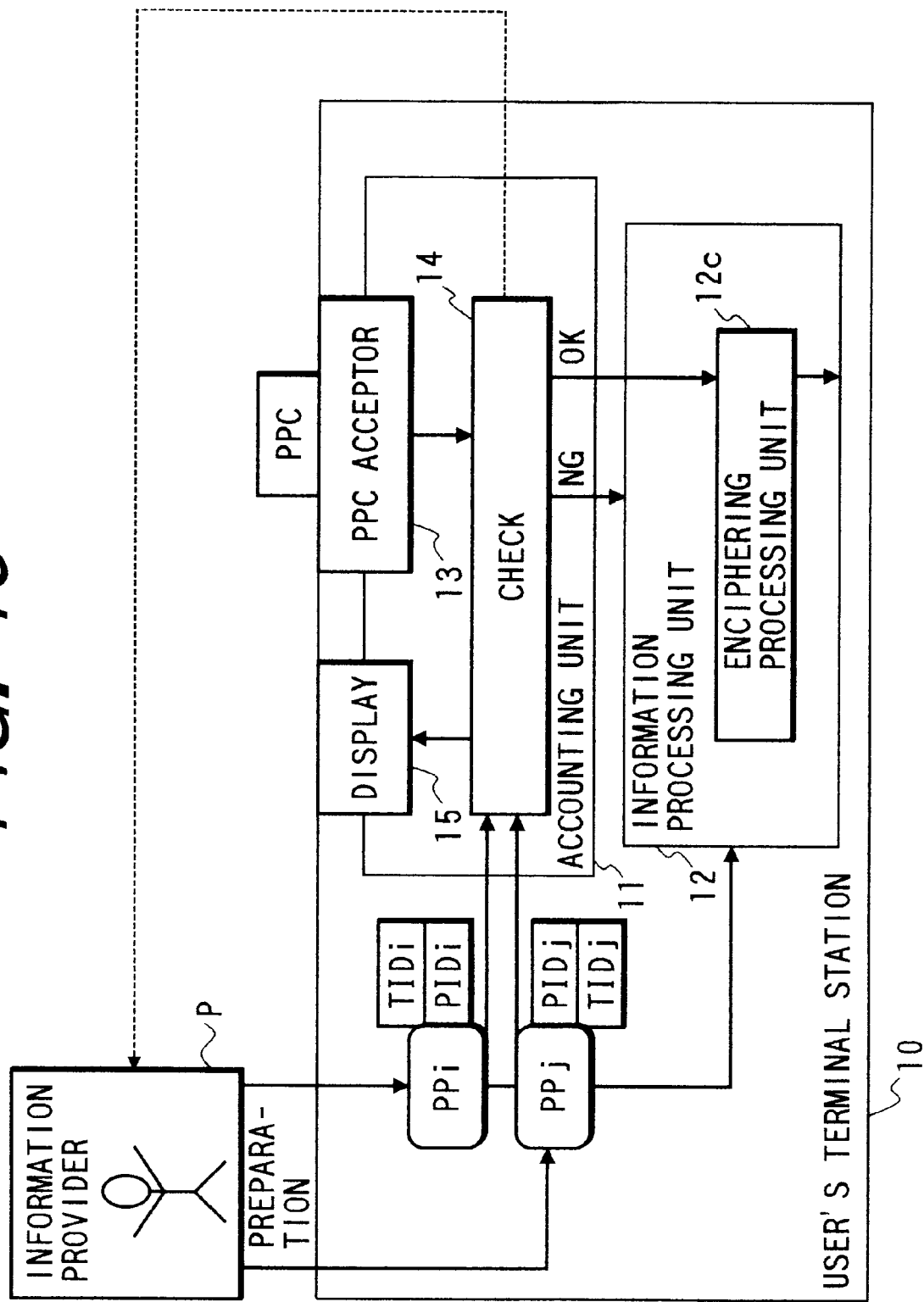
FIG. 16 is a block diagram showing the twelfth embodiment of the invention.

The accounting operation according to the embodiment will now be described with reference to FIG. 16. In FIG. 16, the user inserts a PPC into the acceptor 13 of the PPC and reads out money information from the PPC. When the money amount is larger than the charge shown in the PID or TID (the money amount can be also displayed) and the accounting unit 11 can demand the use charge to the PPC, the checking unit 14 permits the use of the PP. Further, it is also possible to construct in a manner such that even when the charge by the PID of the PP, the charge by the TID, or the like is updated with the elapse of time, the device can be continuously used so long as the required charge lies within the charge written in the PPC. As described in the other embodiments, as a PPC, it is also possible to use actual money or a prepaid card by a paper or electronic card.

When the use of the PP is permitted by the checking unit 14, data regarding a processing speed or power of the encipher written in the TID together with the PP is sent to an enciphering processing unit 12c. The enciphering processing unit 12c performs a decoding process corresponding to the processing speed or power. A construction of the enciphering processing unit which can execute the enciphering and decoding processes in accordance with the different processing speed and power as mentioned above can be realized by the technique disclosed in detail in U.S. patent application Ser. No. 08/670,608 as a preceding patent application of the present applicant.

With respect to the distribution of the charge, means similar to those in the other embodiments can be used. For this purpose, a terminal station communication I/F shown in FIG. 16 can be also added.

Since the enciphering processing unit is often developed by the transmission path provider or the like different from the information provider, if the transmission path provider provides the enciphering processing unit to the information provider together with the TID and the information provider provides information together with the PID while annexing to the PP or if the information provider and the network are connected by a connector or the like which is provided by the transmission path provider, when the providing information PP including the PID is sent to the transmission path through the connector, the connector executes the enciphering process and the information can be also annexed to the PP in this instance (the connector can be also provided in the transmission path like a hub). In the case where a certain institution such as an information center collects information from information providers and provides the information in a lump, the center executes the enciphering solely or in cooperation with the transmission path provider and can also set the TID (there is also a case where the center also serves as a transmission path provider or a charge distributor).

As for the distribution of the charge, if the user also notifies the charge distributor of the information regarding the TID together with the information about the PID, in a manner similar to the methods in the other embodiments, it is sufficient for the charge distributor to distribute the charge to the transmission path provider in accordance with the use of the notified TID. Therefore, as a method of distributing the charge, the methods mentioned in the other embodiments can be used. Although the embodiment has been described on the assumption that the transmission path provider develops the enciphering processing unit for simplicity of explanation, in the other cases, the charge is distributed to the legal provider.

The enciphering processing unit is not particularly limited in this embodiment and all of the accounting methods which can cope with different encipher processing speeds and powers are included in the invention.

The thirteenth embodiment of the invention will now be described.

Figure 18:
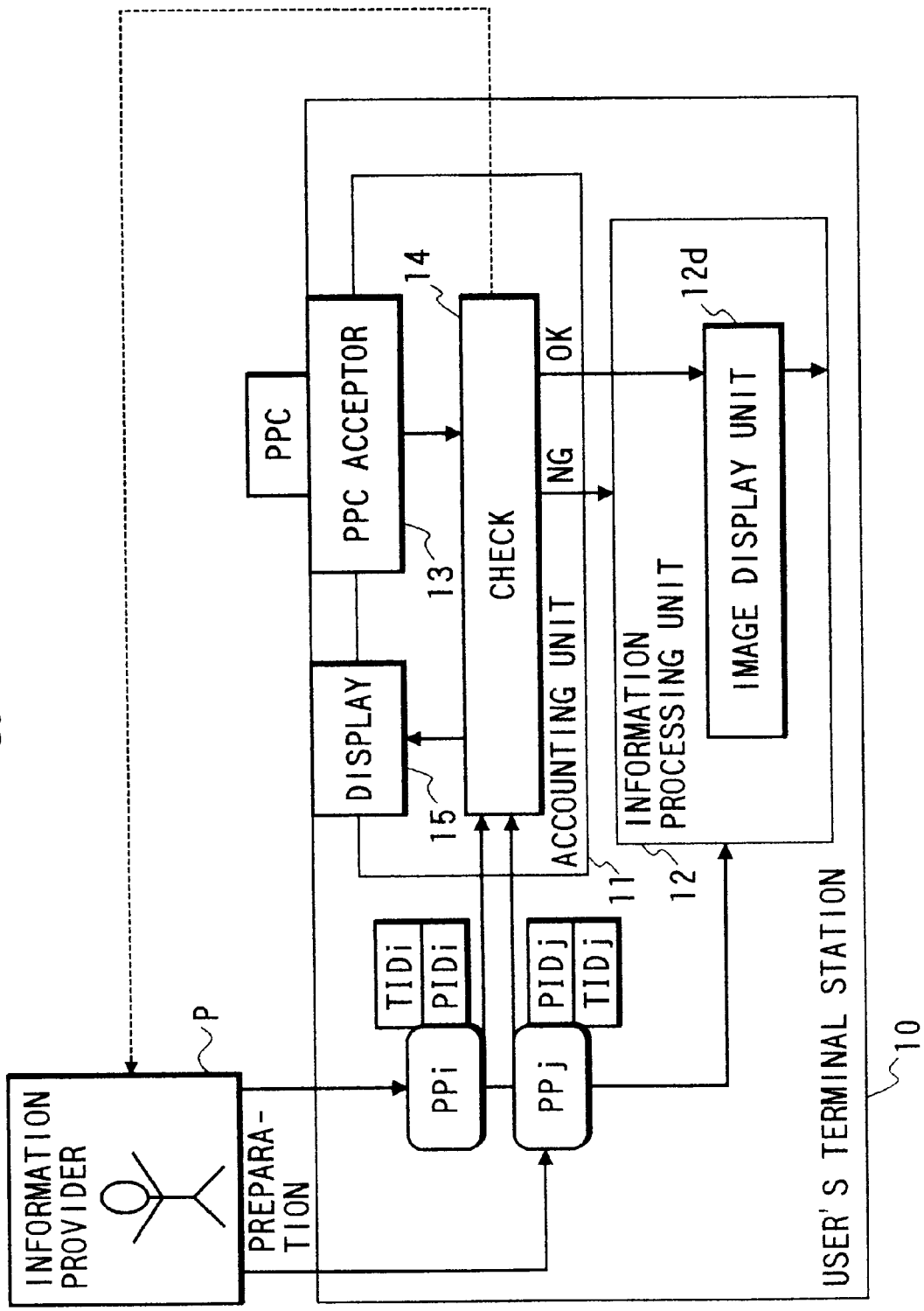
FIG. 18 is a block diagram showing the fourteenth embodiment of the invention.

Although the accounting system regarding the processing speed and power of the encipher has been shown in the twelfth embodiment, as shown in FIG. 18, in case of a network such that not only the processing speed and power of the encipher but also the kind of encipher is different, it is important to realize the accounting according to the kind of encipher.

Figure 17:
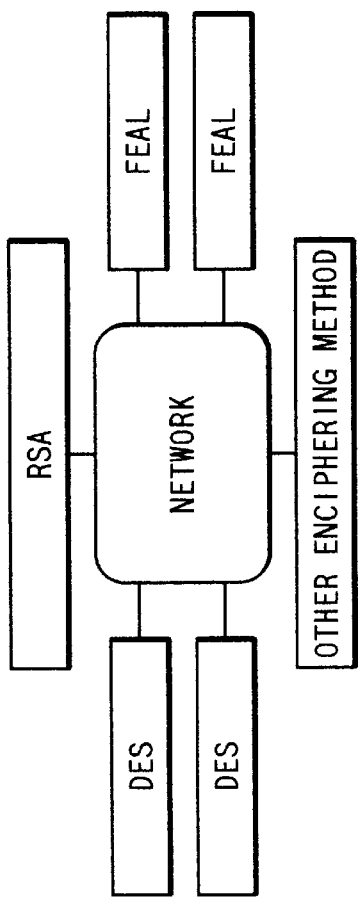
FIG. 17 is a block diagram showing a network in the thirteenth embodiment of the invention.

In this case, if the charge according to the kind of encipher to be used has been written in the TID, it will be obviously understood that the accounting operations according to various enciphers can be realized by collecting the charge according to it from the PPC. However, it is assumed that the providing information has been enciphered by the encipher written in the TID. In a manner similar to the twelfth embodiment, in each encipher, a fine setting according to the processing speed or power can be also performed for the TID. In this case, such a setting can be obviously realized by a construction shown in FIG. 17 in a manner similar to the twelfth embodiment. However, the enciphering processing unit in FIG. 16 is an enciphering processing unit which each terminal station has.

An accounting for a case where each terminal station can select an encipher to be used in accordance with the kind of information is also considered. Such an enciphering processing unit which can select the encipher to be used has similarly been disclosed in U.S. patent application Ser. No. 08/670,608. Therefore, by using the enciphering processing unit shown in the above prior art as an enciphering processing unit in FIG. 16, an accounting for a case where the encipher can be selected by a construction similar to FIG. 16 can be also realized. In this instance, it is also possible to construct in a manner such that the kinds of all enciphers and their charges are written in the TID and the accounting by the TID can be also carried out in accordance with the used encipher, based on the written information. A fine setting regarding the accounting can be also performed every encipher.

The fourteenth embodiment relates to an accounting for an image quality of information that is provided. The image quality here denotes the number of resolutions or the like of a dynamic range of a degree such as number of frames per unit time, number of pixels of an image, chromaticity of each pixel included in the image, saturation of each pixel, brightness of each pixel, or the like. In each item, as the image has a wider dynamic range and a finer gradation, the image quality is high.

In the embodiment, each item of such an image quality will be explained as an example of the TID hereinbelow. The image quality based on those items is data that is not peculiar to information. Namely, even in the same one information, the image quality of information which is sent through the transmission path is different in accordance with a traffic of the transmission path, a resolution of a monitor of the user, a precision of the data retrieval, or the like. Therefore, it is assumed that the TID shows the image quality when the providing information is sent and the charge or the like regarding the image quality. For example, even in case of the same information, a charge which is written in the TID and is required when information of coarse pixels is transmitted and a charge which is written in the TID and is required when information of fine pixels is transmitted are different. In the transmission itself, the information is sent at the highest image quality and when the image is displayed, it can be also displayed at an arbitrary image quality according to the necessity. In this case, it is also possible to construct such that the charges for all qualities are shown in the TID and an accounting according to the quality used is carried out.

Figure 19:
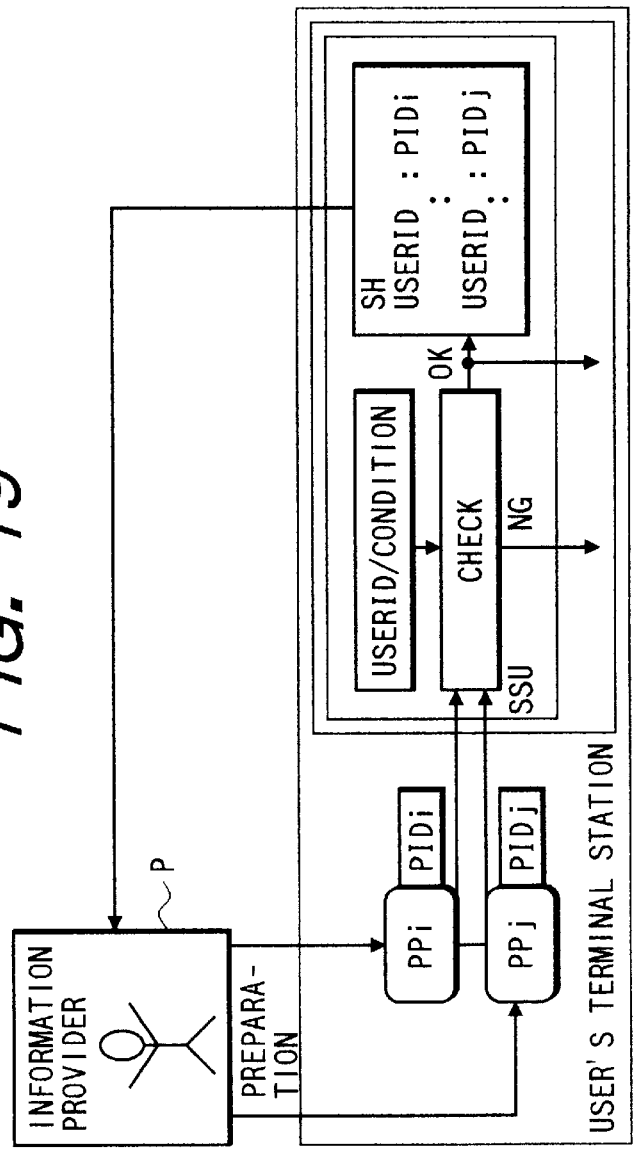
FIG. 19 is a block diagram showing a conventional super distribution.

The accounting operation according to this embodiment will now be described with reference to FIG. 18. In FIG. 19, the user inserts a PPC into the acceptor 13 of the PPC and reads out money information from the PPC. When the money amount is larger than the charge shown in the PID or TID (the money amount can be also displayed) and when the accounting unit 11 can demand a use charge to the PPC, the checking unit 14 permits the use of the PP. However, when all of the quality data is sent and the image is displayed at the designated quality, there is input means such as a keyboard or the like (not shown) for inputting the designated quality to the accounting means and the charge about the TID is discriminated by it. Further, it is also possible to construct in a manner such that even if the charge by the PID of the PP, the charge by the TID, or the like is updated with an elapse of time, the device can be continuously used so long as the required charge lies within the charge written in the PPC. As described in the other embodiments, as a PPC, it is also possible to use the actual money or a prepaid card by a paper or an electronic card.

When the use of the PP is permitted by the checking unit 14, the data about the quality written in the TID is sent together with the PP to an image display unit 12d. The image display unit 12d displays the image on a monitor at a quality corresponding to such a quality. Even when the PP includes all of the quality data and the user or terminal station designates a display quality as well, the designated quality is sent together with the PP to the image display unit 12d. The image display unit 12d displays at a quality corresponding to the designated quality.

With respect to the distribution of the charge, means similar to those in the other embodiments can be used. For this purpose, a terminal station communication I/F shown in FIG. 18 can be also added.

Since the image display unit is often developed by the terminal station provider or the like different from the information provider, if the terminal station provider provides the image display unit to the information provider together with the TID and the information provider provides information together with the PID while annexing to the PP or if a function to add the TID to a connector or the like with the network in cooperation with the transmission path provider is added and when the providing information PP including the PID is sent through the connector, the connector can be annexed with the TID (the connector can be also provided in the transmission path like a hub). In the case where a certain institution such as an information center collects information from information providers and provides the information in a lump, the center executes a hierarchical coding solely or in cooperation with the terminal station provider and can also set the TID (there is also a case where the center also serves as a terminal station provider or a charge distributor).

As for the distribution of the charge, if the user also notifies the charge distributor of the information regarding the TID in addition to the information about the PID, in a manner similar to the methods in the other embodiments, it is sufficient to distribute the charge to the terminal station provider in accordance with the use of the notified TID. Therefore, as a method of distributing the charge, the methods mentioned in the other embodiments can be used. Although the embodiment has been described on the assumption that the terminal station provider develops the image display unit for simplicity of explanation, in the other cases, the charge is distributed to the legal provider.

The fifteenth embodiment of the invention will now be described.

The accounting systems regarding the line, terminal station, image compression, encipher, image quality, and the like have been shown in the ninth to fourteenth embodiments. In the invention, the accounting systems proposed can be also applied by specifying a form of the TID such that a target to be charged is also written in the TID or the like even for a network in which those accounting systems mixedly exist. By specifying the form such that the kind of process is written in the PID or TID or the like, the present accounting system can also obviously cope with various processes other than the foregoing processes. It will be apparently understood that there is obtained an accounting system of a high flexibility such that various providers regarding the network other than the foregoing information provider P can also freely participate.

It will be also obviously understood that the accounting according to the processing speed of the encipher shown in the 12th embodiment can be also set in accordance with various processing speeds of an image coding and the like without limiting to only the encipher. The safety can be also obviously set for various safeties of the access control and the like without limiting to only the power of the encipher.

It is also possible to construct such that the TID is solely transmitted and received as data of a specific form instead of transmitting and receiving together with the information and, when the charge shown in the TID lies within the money amount in the PPC, the providing information is transmitted. After that, the accounting regarding the PID can be also carried out with respect to the use of the providing information. Further, the PID can be also solely transmitted and received as data of a specific form in a manner similar to the TID. In this case, by constructing such that the providing information is transmitted only when the charges regarding the PID and TID lie within the money amount in the PPC, the transmission path can be efficiently used.

For instance, when the TID is the data peculiar to the terminal station, it will be obviously understood that the TID doesn't need to be transmitted and received through the network as mentioned above but when a storing unit of the TID exists in the terminal station and when the permission or inhibition of the use of the providing information PP is discriminated, if the data about the TID is sent to the checking unit 14 therefrom, a similar accounting process can be executed. Since the TID is not the data peculiar to the information, it is effective to a portion peculiar to the TID without limiting to the terminal station.

A charge of 0 (free) is also included in the charge. Therefore, there is also a case where the providing information or a part of it (in case of coarse pixels of the hierarchical coding or the like) can be also used free.

The encipher which is used in the invention will now be described.

Common Key Encrypting System

The common key encrypting system is an encrypting system in which the same encrypting key is secretly shared by the transmitter and the receiver (this system is also called a secret key encrypting system, symmetrical encrypting system, or idiomatic encrypting system). The common key encrypting system can be divided into a block cipher in which information is encrypting the same key every character train (block) of a proper length and a stream cipher in which the key is changed every character train or bit. The block cipher includes a transposition type cipher in which the order of characters is transposed, thereby encrypting, a character change type encipher in which a character is replaced to another character, and the like. In this case, a correspondence table of the transposition and character change becomes an encrypting key.

Public Key Encrypting System

The public key encrypting system is an encrypting system in which the encrypting key and the decoding key are different and the encrypting key is publicly held and the decoding key is secretly held (therefore, the encrypting key is also called a public key and the decoding key is also called a secret key). The public key encrypting has the following features which are not obtained in the common key encrypting.

(1) Since the encrypting key and the decoding key are different and the encrypting key can be published, there is no need to secretly distribute the enciphering key and the key distribution is easy.

(2) Since the encrypting key of each user is published, it is sufficient for the user to secretly store only the own decoding key and the management of the key is easy.

(3) Since the receiver confirms that the transmitter of the communication sentence sent is not a pretender and that the communication sentence is not altered, the authorizing function can be realized.

An enciphering communication and an authorizing communication of the public key encipher and an enciphering communication with the authorizing function are realized by the following protocol. A protocol in the case where the enciphering communication, the authorizing communication, and the enciphering communication with the authorizing function are executed from a transmitter A to a receiver B is shown here. A secret key of A assumes ksA and a public key assumes kpA. A secret key of B assumes ksB and a public key assumes kpB. For a communication sentence M, the encrypting operation using the public key kp is expressed by E(kp, M) and the decoding operation using the secret decoding key ks is expressed by D(ks, M).

Encrypting Communication

In a case of secretly communicating the communication sentence (plane sentence) M from A to B, it is communicated by the following procedure.

Step1: A enciphers M by the public key kpB of B and sends an encrypted sentence C to B.

C=E(kpB, M)

Step2: B decodes C by its own secret key ksB and obtains the original plane sentence M.

M=D(ksB, C)

Since the public key of the receiver B is published for many and unspecified persons, all persons can secretly communicate with B without limiting to A.

Certification Communication

In case of performing the certification communication of the communication sentence (plane sentence) M from A to B, it is communicated by the following procedure.

Step1: A forms a transmission sentence S by its own secret key ksA and sends to B.

S=D(ksA, M)

This transmission sentence S is called a signature sentence and the operation to obtain the signature sentence is called a signature.

Step2: B reconstructs and converts the transmission sentence S by the public key kpA of A and obtains the original plane sentence M.

M=E(kpA, S)

If it is confirmed that M is the meaningful sentence, it is certificated that M has certainly been sent from A. Since the public key of the transmitter A is published for many and unspecified persons, all persons can certificate the signature sentence of A without limiting to B. Such a certification is also called a digital signature.

Encrypting Communication With Signature

In case of performing a secret communication with signature of the communication sentence (plane sentence) M from A to B, it is communicated by the following procedure.

Step1: A makes a signature to M by the own secret key ksA and forms a signature sentence S.

S=D(ksA, M)

Further, A encrypts S by the public key kpB of B and sends the encrypted sentence C to B.

C=E(kpB, S)

Step2: B decodes C by its own secret key ksB and obtains a signature sentence S.

S=D(ksB, C)

Further, B reconstructs and converts S by the public key kpA of A and obtains the original plane sentence M.

M=E(kpA, S)

If it is confirmed that M is the meaningful sentence, it is certificated that M has certainly been sent from A. The order to perform a function in each step can be reversed, respectively.

According to the invention as described above, the accounting device, communicating apparatus, and communication system which can perform a proper accounting can be obtained. By using them, the accounting method and accounting system which can solve the problems shown in (1) to (5) mentioned above can be realized.

Thus, the user can protect his privacy while cheaply using various information in a rental manner. The information provider can receive a distribution of the use charge in accordance with a use frequency of the providing information without managing the information use of every user. For example, by introducing the charge distributor or charge accommodator including the sales store, an accounting system of a good use efficiency including a payment of the charge can be constructed.

Further, it is possible to construct a flexible accounting system which can also distribute a fair charge to various providers regarding the network other than the information provider by the annexed data that is not peculiar to the information.

Instead of the information itself, by the annexed data indicative of its attribute or a service annexed to the information or the like, the terminal station and line can be properly used.

Many widely different embodiments of the present invention may be constructed without departing from the spirit and scope of the present invention. It should be understood that the present invention is not limited to the specific embodiments described in the specification, except as defined in the appended claims.

What is claimed is:

1. An accounting device which cooperates with a terminal station which is used for the user to use information from an information provider, comprising:

a first input device, via which is input first data, regarding contents of information sought to be provided;

a second input device, via which is input second data, regarding a use charge for use of said terminal station;

a third input device, via which is input third data, indicative of money information; and a discriminator, that discriminates a permission or an inhibition of the use of said information at said terminal station by using (i) at least one of said first data and said second data, and (ii) said third data, wherein said discriminator outputs from said device a discrimination result about the permission or the inhibition of said use.

2. A device according to claim 1, wherein said discriminator calculates fourth data indicative of a use charge of said information from said first and/or second data and compares said third data with said fourth data.

3. A device according to claim 1, wherein said device is enclosed in said terminal station.

4. A device according to claim 1, wherein said third input device is constructed to obtain, as said money information, information regarding cash inputted.

5. A device according to claim 1, wherein said third input device is constructed to obtain said money information from information written in a prepaid card.

6. A device according to claim 1, wherein said third input device is constructed to receive said money information in the form of electronic information.

7. A device according to claim 1, wherein said third input device is constructed to receive said third data through a network to which said terminal station is connected.

8. A device according to claim 1, wherein said discriminator is constructed to use, as said second data, data indicative of a use charge of a network to which said terminal station is connected.

9. A device according to claim 1, wherein said information sought to be provided is enciphered information, and wherein said discriminator is constructed to process, as said second data, information concerned with a decoding processing time of said enciphered information.

10. A communicating apparatus which is used for the user to use information from an information provider, comprising:

a first input device, via which is input first data, regarding contents of information sought to be provided;

a second input device, via which is input second data, regarding a use charge for use of a terminal station;

a third input device, via which is input third data, indicative of money information; and a discriminator, that discriminates a permission or an inhibition of the use of said information in said apparatus by using at least one of said first data and said second data, and said third data.

11. An apparatus according to claim 10, wherein said discriminator calculates fourth data indicative of a use charge of said information from said first and/or second data and compares said third data with said fourth data.

12. An apparatus according to claim 11, wherein said discriminator is constructed to use, as said second data, data regarding a use charge of a network to which said communicating apparatus is connected, and a second communicating apparatus, for a provider of said network, and a third communication apparatus, for a charge accommodator to send money information corresponding to said second data to said second communicating apparatus for said network provider, are connected to said network.

13. An apparatus according to claim 11, wherein the claimed communicating apparatus is a first communicating apparatus, and wherein said discriminator is constructed to use, as said second data, data regarding a use charge of said first communicating apparatus, and wherein a second communicating apparatus, for a provider of said first communicating apparatus, and a third communicating apparatus, for a charge accommodator to send money information corresponding to said second data to said second communicating apparatus for said communicating apparatus provider, are connected to a network to which said first communicating apparatus is connected.

14. An apparatus according to claim 11, wherein a second communicating apparatus, for said information provider, and a third communicating apparatus, for a charge accommodator to send money information corresponding to said first data to said second communicating apparatus for said information provider, are connected to a network to which the claimed communicating apparatus is connected.

15. An apparatus according to claim 14, where said discriminator is constructed to use, as said second data, data regarding a user charge of said network, and a fourth communicating apparatus, for a provider of said network, and a fifth communicating apparatus, for a charge distributor to distribute money information corresponding to said fourth data which was advanced by said third communicating apparatus for said charge accommodator to said second communicating apparatus for said information provider and said fourth communicating apparatus for said network provider, are further connected to said network.

16. An apparatus according to claim 14, wherein said discriminator is constructed to use, as said second data, data regarding a use charge of the claimed communicating apparatus, and a fourth communicating apparatus, for a provider of the claimed communicating apparatus, and a fifth communicating apparatus, for a charge distributor to distribute money information corresponding to said fourth data which was advanced by said third communicating apparatus for said charge accommodator to said second communicating apparatus for said information provider, and said fourth communicating apparatus for said communicating apparatus provider are further connected to said network.

17. A communication system comprising:
- a first communicating apparatus, for an information provider for providing information; and
- a second communicating apparatus, for a user which is used for the user to use the information,
- wherein said first communicating apparatus for said information provider and said second communicating apparatus for said user are connected to a common network, and
- wherein said second communicating apparatus for said user includes:
  - an inputter, by means of which are input first data regarding contents of providing information, second data regarding a use charge for use of a terminal station, and third data indicative of money information; and
  - a discriminator, that discriminates a permission or an inhibition of the use of said information in said apparatus by using at least one of said first data and said second data, and said third data.

18. A system according to claim 17, wherein said discriminator calculates fourth data indicative of a use charge of said information from said first and/or second data and compares said third data with said fourth data.

19. A system according to claim 18, wherein said second data is data regarding a use charge of a network to which said system is connected, and a third communicating apparatus, for a provider of said network, and a fourth communicating apparatus, for a charge accommodator to send money information corresponding to said second data to said third communicating apparatus for said network provider are connected to said network.

20. A system according to claim 18, wherein said second data is data regarding a use charge of said communicating apparatus, and a third communicating apparatus, for a provider of said communicating apparatus, and a fourth communicating apparatus, for a charge accommodator to send money information corresponding to said second data to said third communicating apparatus for said communicating apparatus provider are connected to a network to which said communication system is connected.

21. A system according to claim 18, wherein said first communicating apparatus for said information provider and a third communicating apparatus for a charge accommodator to send money information corresponding to said first data to said first communicating apparatus for said information provider are connected to a network to which said communication system is connected.

22. A system according to claim 21, wherein said second data is data regarding a use charge of said network, and a fourth communicating apparatus for a provider of said network and a fifth communicating apparatus for a charge distributor to distribute money information corresponding to said fourth data which was advanced by said third communicating apparatus for said charge accommodator to said first communicating apparatus for said information provider and said fourth communicating apparatus for said network provider are further connected to said network.

23. A system according to claim 21, wherein said second data is data regarding a use charge of said second communicating apparatus, and wherein a fourth communicating apparatus, for a provider of said second communicating apparatus, and a fifth communicating apparatus, for a charge distributor to distribute money information corresponding to said fourth data which was advanced by said third communicating apparatus for said charge accommodator to said first communicating apparatus for said information provider and said fourth communicating apparatus for said communication apparatus provider are further connected to said network.

24. An accounting method for use with an accounting device which cooperates with a terminal station which is used for the user to use information from an information provider, said method comprising the steps of:
- inputting first data, regarding contents of information sought to be provided;
- inputting second data, regarding a use charge for use of the terminal station;
- inputting third data, indicative of money information; and
- discriminating a permission or an inhibition of the use of the information at the terminal station by using (i) at least one of said first data and said second data, and (ii) said third data, wherein said discriminating step includes outputting a discrimination result about the permission or the inhibition of said use.

25. A communication method for use in a system that comprises:

a first communicating apparatus, for an information provider for providing information; and a second communicating apparatus, for a user which is used for the user to use the information, wherein the first communicating apparatus for the information provider and the second communicating apparatus for the user are connected to a common network, said method comprising the steps of:

the second communicating apparatus for the user inputting first data regarding contents of providing information, second data regarding a use charge for use of a terminal station, and third data indicative of money information; and the second communicating apparatus for the user discriminating a permission or an inhibition of the use of the information in the apparatus by using at least one of the first data and the second data, and the third data.

26. A memory medium storing computer-executable codes for an accounting method for use with an accounting device which cooperates with a terminal station which is used for the user to use information from an information provider, said method comprising the steps of:

inputting first data, regarding contents of information sought to be provided;

inputting second data, regarding a use charge for use of the terminal station;

inputting third data, indicative of money information; and discriminating a permission or an inhibition of the use of the information at the terminal station by using (i) at least one of said first data and said second data, and (ii) said third data, wherein said discriminating step includes outputting a discrimination result about the permission or the inhibition of said use.

27. A memory medium storing computer-executable code for a communication method for use in a system that comprises:

a first communicating apparatus, for an information provider for providing information; and a second communicating apparatus, for a user which is used for the user to use the information, wherein the first communicating apparatus for the information provider and the second communicating apparatus for the user are connected to a common network, said method comprising the steps of:

the second communicating apparatus for the user inputting first data regarding contents of providing information, second data regarding a use charge for use of a terminal station, and third data indicative of money information; and the second communicating apparatus for the user discriminating a permission or an inhibition of the use of the information in the apparatus by using at least one of the first data and the second data, and the third data.

* * * * *

UNITED STATES PATENT AND TRADEMARK OFFICE
CERTIFICATE OF CORRECTION

PATENT NO. : 6,144,946
DATED : November 7, 2000
INVENTOR(S) : Keiichi Iwamura

It is certified that error appears in the above-identified patent and that said Letters Patent is hereby corrected as shown below:

Title page,
Item [57], ABSTRACT,
Line 15, "prohibit" should read -- prohibiting --.

Column 1,
Line 39, "there" should read -- these --;
Line 46, "6468835," should read -- 64-68835, --;
Line 54, "career" should read -- history --;
Line 57, "career." should read -- history. --.

Column 2,
Line 62, "the" (second occurrence) should be deleted.

Column 4,
Line 34, "onerous" should read -- voluminous --.

Column 5,
Line 19, "is" should read -- this --;
Line 40, "career" should read -- history --;
Line 58, "method" should read -- methods --;
Line 59, "methods" should read -- method --.

Column 6,
Line 3, "an" should be deleted.

Column 8,
Lines 19 and 24, "a" should be deleted.

Column 10,
Line 44, "of a yen." should read -- in yen. --.

Column 14,
Line 8, "many" should read -- much --.

Column 15,
Line 5, "their" should read -- its --.

Column 26,
Line 19, "encrypting" should read -- encrypted by --;
Line 39, "enciphering" should read -- encrypting --.

UNITED STATES PATENT AND TRADEMARK OFFICE
CERTIFICATE OF CORRECTION

PATENT NO. : 6,144,946
DATED : November 7, 2000
INVENTOR(S) : Keiichi Iwamura

It is certified that error appears in the above-identified patent and that said Letters Patent is hereby corrected as shown below:

<u>Column 30,</u>
Lines 15, 24, 30 and 52, "provider" should read -- provider, --;
Line 41, "vider" should read -- vider, --.

Signed and Sealed this

Twenty-seventh Day of November, 2001

Attest:

*Nicholas P. Godici*

NICHOLAS P. GODICI
*Attesting Officer*      *Acting Director of the United States Patent and Trademark Office*